(12) United States Patent
Itou et al.

(10) Patent No.: US 11,685,437 B2
(45) Date of Patent: Jun. 27, 2023

(54) STEERING CONTROL DEVICE

(71) Applicant: HITACHI AUTOMOTIVE SYSTEMS, LTD., Hitachinaka (JP)

(72) Inventors: Takahiro Itou, Tokyo (JP); Kazuya Yamano, Hitachinaka (JP); Yasuhito Nakakuki, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 311 days.

(21) Appl. No.: 16/348,225

(22) PCT Filed: Nov. 1, 2017

(86) PCT No.: PCT/JP2017/039599
§ 371 (c)(1),
(2) Date: May 8, 2019

(87) PCT Pub. No.: WO2018/096897
PCT Pub. Date: May 31, 2018

(65) Prior Publication Data
US 2019/0276077 A1    Sep. 12, 2019

(30) Foreign Application Priority Data
Nov. 22, 2016    (JP) .............................. JP2016-226787

(51) Int. Cl.
*B62D 15/02* (2006.01)
*B60W 10/20* (2006.01)
(Continued)

(52) U.S. Cl.
CPC ............. *B62D 15/02* (2013.01); *B60W 10/20* (2013.01); *B60W 30/00* (2013.01); *B62D 3/12* (2013.01); *B62D 6/00* (2013.01); *B62D 6/08* (2013.01)

(58) Field of Classification Search
CPC . B62D 15/02; B62D 3/12; B62D 6/00; B62D 6/08; B60W 10/20; B60W 30/00
See application file for complete search history.

(56) References Cited

U.S. PATENT DOCUMENTS 8,838,339 B2 * 9/2014 Riepold ................. G01L 5/221
701/42
2001/0054519 A1 12/2001 Nishiwaki et al.
(Continued)

FOREIGN PATENT DOCUMENTS

DE   10 2010 048913 A1   6/2011
DE   10 2014 107194 A1   11/2015
(Continued)

OTHER PUBLICATIONS

International Search Report, PCT/JP2017/039599, 2 pgs.
German Office Action dated Oct. 11, 2021 for German Patent Application No. 112017005368.4.

*Primary Examiner* — Yonel Beaulieu
*Assistant Examiner* — Charles Pall
(74) *Attorney, Agent, or Firm* — Volpe Koenig

(57) ABSTRACT

The steering control device includes an automatic steering controller that generates an automatic steering control amount and a manual steering controller that generates a manual steering control amount, and selects either one of an automatic steering mode and a manual steering mode to control an electric motor. When steering torque exceeds a predetermined value during the control in the automatic steering mode, the manual steering controller generates a manual steering control amount change based on the change in the manual operation amount with reference to the time of exceeding, generates the manual steering control amount based on the steering torque, controls the electric motor based on a control amount obtained by adding the manual steering control amount change to the automatic steering (Continued)

control amount at the time of exceeding, and then controls the electric motor in the manual steering mode.

7 Claims, 19 Drawing Sheets

(51) Int. Cl.
*B60W 30/00* (2006.01)
*B62D 6/08* (2006.01)
*B62D 6/00* (2006.01)
*B62D 3/12* (2006.01)

(56) References Cited

U.S. PATENT DOCUMENTS

| | | |
|---|---|---|
| 2006/0089770 A1 | 4/2006 | Ito |
| 2011/0098890 A1 | 4/2011 | Lee et al. |
| 2013/0060414 A1* | 3/2013 | Lee ........................ B62D 1/286 |
| | | 701/23 |
| 2015/0191199 A1* | 7/2015 | Tsubaki ................... B62D 6/10 |
| | | 701/42 |
| 2017/0137060 A1 | 5/2017 | Wanner et al. |
| 2017/0305459 A1 | 10/2017 | Minaki et al. |
| 2018/0297631 A1* | 10/2018 | Miyatani ................. B62D 6/00 |
| 2019/0210598 A1* | 7/2019 | Endo ....................... B62D 6/002 |

FOREIGN PATENT DOCUMENTS

| | | | | |
|---|---|---|---|---|
| JP | 09-240502 A | | 9/1997 | |
| JP | 2002-002519 A | | 1/2002 | |
| JP | 2006-117181 A | | 5/2006 | |
| JP | 2010012979 A | * | 1/2010 | |
| WO | 2014/162769 A1 | | 10/2014 | |
| WO | WO-2016080452 A1 | * | 5/2016 | ............ B60W 30/00 |
| WO | 2016/088704 A1 | | 6/2016 | |

* cited by examiner

STEERING CONTROL DEVICE

TECHNICAL FIELD

The present invention relates to a steering control device.

BACKGROUND ART

As a steering device for an automobile, a power steering device is used. As a steering control device for use in the steering device, there is known a steering control device that has a function of selecting a manual steering mode and an automatic steering mode as proposed in PTL 1, for example. In the manual steering mode, the steering control device performs an assist control to control an actuator including a motor and the like to give a steering assist force for assisting a driver's steering force based on the driving state of the vehicle. In the automatic steering mode, the steering control device automatically adjusts the steering angle of the turning wheels by controlling the actuator according to the target steering angle based on the command value from the host controller. The steering control device detects the steering torque by a torque sensor when the driver operates the steering wheel, switches to the automatic steering mode when the detected steering torque is less than a threshold, and switches to the manual steering mode when the detected steering torque is equal to or greater than the threshold.

CITATION LIST

Patent Literature

PTL 1: JP 9-240502 A

SUMMARY OF INVENTION

Technical Problem

As described above, in the vehicle steering device disclosed in PTL 1, when the steering torque in the automatic steering mode exceeds the threshold, the steering control device shifts to the manual steering mode. However, in the manual steering mode, since the steering control device generates the assist force according to the steering torque at the time of operating the steering wheel, the feel of the steering wheel differs depending on the difference in magnitude between the actuator output immediately after the steering torque reaches the threshold and the actuator output immediately before switching (in the automatic steering mode). For example, when the actuator output is larger than the actuator output immediately before the shift and is in the same direction as before the shift, the steering wheel suddenly feels lighter, and in contrast, when the actuator output is smaller than the actuator output immediately before the shift, the steering wheel feels like being pushed back. Such an uncomfortable feeling interferes with the driving operation, which may constitute a factor of disturbing the vehicle behavior when the vehicle is running.

Solution to Problem

According to one aspect of the present invention, there is provided a steering control device that includes: an automatic steering controller that generates an automatic steering control amount of a steering actuator for turning a vehicle wheel based on an input automatic running command; and a manual steering controller that generates a manual steering control amount of the steering actuator based on a manual operation amount of a manual operation unit for turning the vehicle wheel. The steering control device selects one of an automatic steering mode for controlling the steering actuator by the automatic steering control amount and a manual steering mode for controlling the steering actuator by the manual steering control amount to control the steering actuator. When the manual operation amount of the manual operation unit for turning the vehicle wheel exceeds a predetermined value during the control in the automatic steering mode, the manual steering controller generates a manual steering control amount change based on a change in the manual operation amount with reference to the time of exceeding and then generates the manual steering control amount based on the manual operation amount, and controls the steering actuator based on a first control amount obtained by adding the manual steering control amount change to the automatic steering control amount at the time of exceeding, and then controls the steering actuator in the manual steering mode.

Advantageous Effects of Invention

According to the present invention, it is possible to reduce uncomfortable feeling of steering when shifting from the automatic steering mode to the manual steering mode.

DESCRIPTION OF EMBODIMENTS

Hereinafter, modes for carrying out the present invention will be described with reference to the drawings. It should be noted that the present invention is not limited to the following embodiments, but includes various modification examples and application examples within the technical concept of the present invention.

First Embodiment

Figure 1:
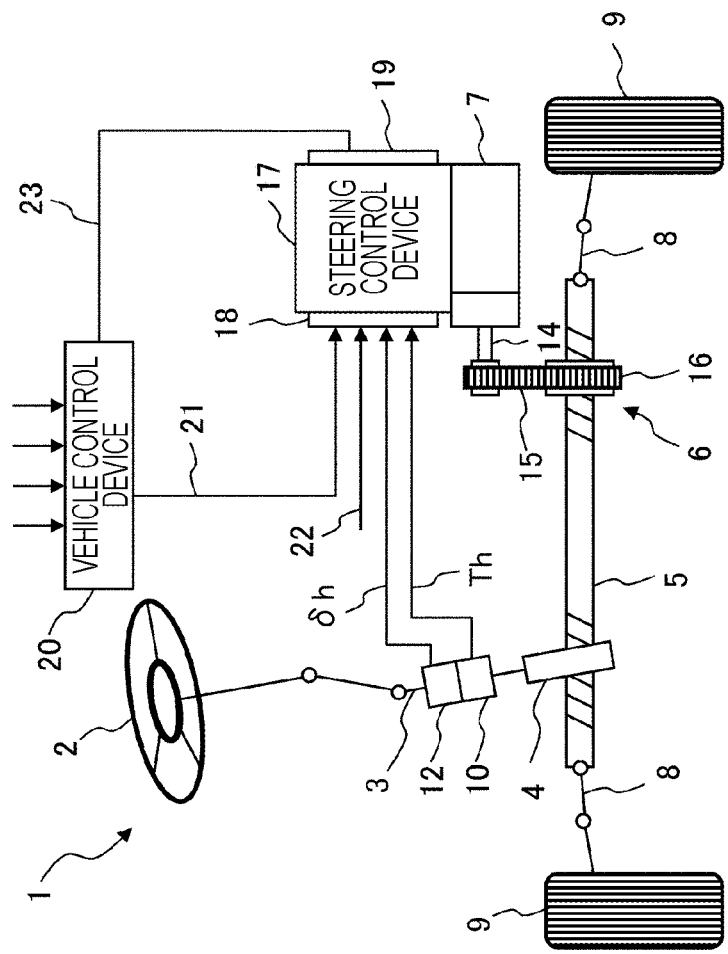
FIG. 1 is a diagram illustrating a steering device and a steering control device.

FIG. 1 is a diagram illustrating a steering device 1 and a steering control device 17. The configuration illustrated in FIG. 1 is in common among all the embodiments described below. The steering device 1 includes a steering wheel 2, a steering shaft 3, a pinion shaft 4, a rack shaft 5, and an electric motor 7.

A torque sensor 10 is provided between the steering shaft 3 and the pinion shaft 4. The torque sensor 10 outputs steering torque Th based on a torsion angle of a torsion bar not illustrated. The torsion bar not illustrated is disposed at a connecting portion between the steering shaft 3 and the pinion shaft 4. A steering angle sensor 12 for detecting a steering angle as a rotation angle of the steering wheel 2 is disposed on the steering shaft 3 side of the torsion bar.

The rack shaft 5 having rack teeth meshing with the pinion shaft 4 forms a rack and pinion mechanism together with the pinion shaft 4. When the steering wheel 2 is rotated, the rotation is transmitted to the pinion shaft 4 via the steering shaft 3, and the rotation of the pinion shaft 4 is converted into the linear motion of the rack shaft 5 by the rack and pinion mechanism. As a result, turning wheels 9 are turned through tie rods 8 connected to both ends of the rack shaft 5.

The electric motor 7 as an actuator is connected to the rack shaft 5 via a speed reduction mechanism 6. In the example illustrated in FIG. 1, the speed reduction mechanism 6 includes a belt pulley 15 attached to an output shaft 14 of the electric motor 7 and a ball screw 16 to be driven by the belt pulley 15. The torque of the electric motor 7 is converted into translation direction force of the rack shaft 5 by the speed reduction mechanism 6. The speed reduction mechanism 6 may be configured such that a rack and pinion is used as in the case of steering wheel input or such that a ball screw nut is directly driven by a hollow motor.

The steering control device 17 configured to control the operation of the electric motor 7 includes an input terminal 18 and an output terminal 19. For example, the input terminal 18 accepts inputs of input information 21 from the vehicle control device 20, the steering torque Th from the torque sensor 10, steering angle δh from the steering angle sensor 12, and vehicle state information 22 such as vehicle speed. The input information 21 includes a running mode of the vehicle and a target steering angle related to automatic steering. The output terminal 19 of the steering control device 17 outputs output information 23 including the steering control amount of the steering device 1 and the state information of the steering device 1.

The vehicle control device 20 is a control device mounted on a vehicle with the steering device 1. The vehicle control device 20 has a function of calculating and transmitting control amounts to the actuators of the vehicle including at least the steering device 1 based on information such as vehicle state amounts (vehicle speed, longitudinal and lateral accelerations, yaw rate, etc.), steering operation, accelerator operation, and various switch operations, and a function of selecting an automatic steering mode or a manual steering mode and requesting execution to the actuators.

Figure 2:
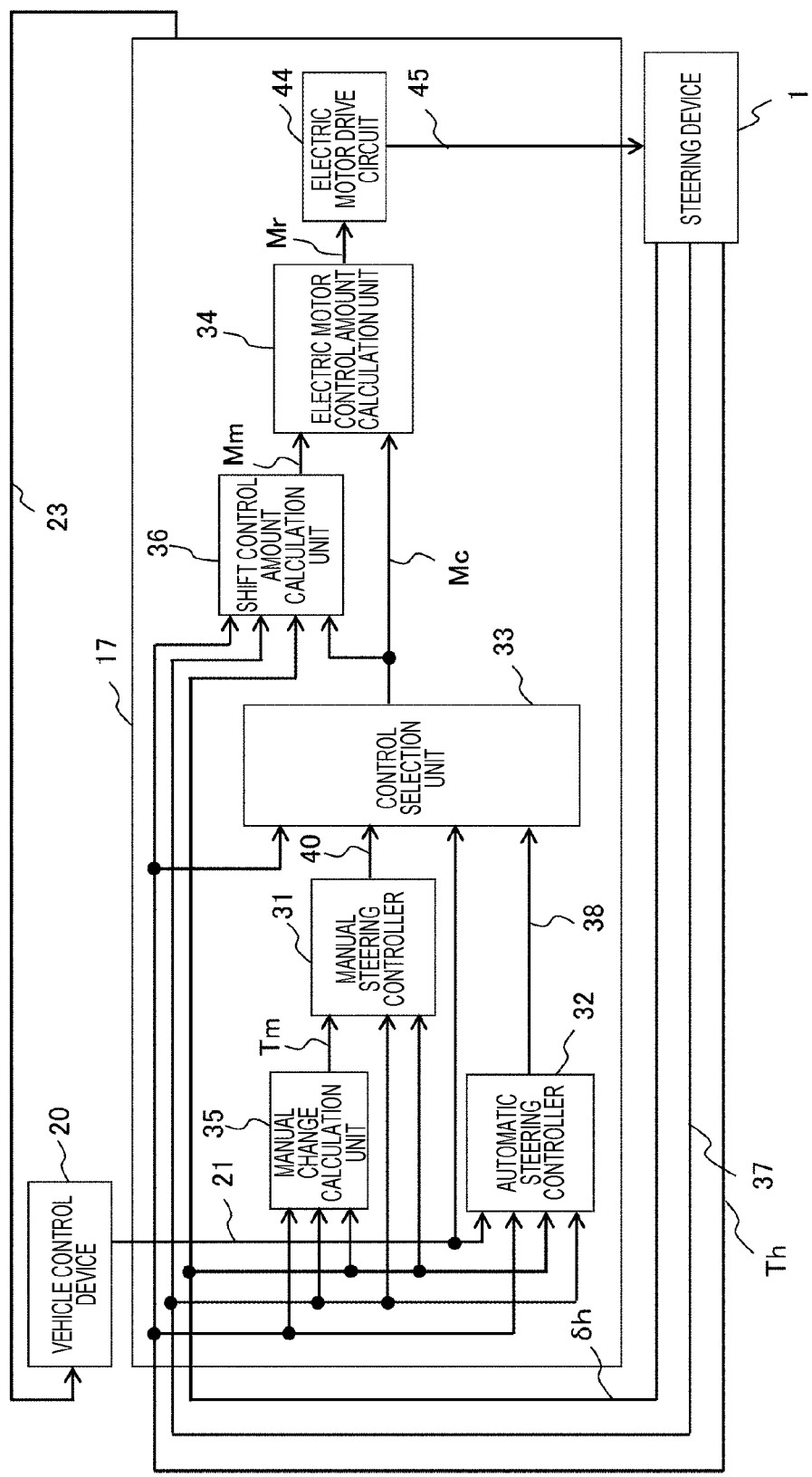
FIG. 2 is a block diagram illustrating a configuration of the steering control device.

FIG. 2 is a block diagram illustrating a configuration of the steering control device 17 that controls the electric motor 7. The steering control device 17 includes at least a manual steering controller 31, an automatic steering controller 32, a control selection unit 33, an electric motor control amount calculation unit 34, a manual change calculation unit 35, a shift control amount calculation unit 36, and an electric motor drive circuit 44.

The automatic steering controller 32 accepts inputs of at least the input information 21 from the vehicle control device 20, the steering angle δh, an actual steering angle 37, and the steering torque Th from the steering device 1. The input information 21 from the vehicle control device 20 includes at least an automatic steering mode execution command for executing the automatic steering mode and a target steering angle. The actual steering angle 37 is the actual rotation angle of the wheels 9 and is calculated from the rotation angle of the electric motor 7 detected by the electric motor drive circuit 44 or detected by a sensor attached to the rack shaft 5.

The automatic steering controller 32 outputs an automatic steering control amount 38 based on the input information listed above. To reduce the steering angle difference between the target steering angle transmitted from the vehicle control device 20 and the actual steering angle 37 of the wheels 9, for example, the automatic steering control amount 38 is a torque command value for requesting the electric motor 7 to produce an output to eliminate the steering angle difference.

The manual steering controller 31 accepts inputs of at least a manual control amount Tm from the manual change calculation unit 35, and the steering angle δh and the actual steering angle 37 from the steering device 1. Based on the input steering torque Th, steering angle δh, and actual steering angle 37, the manual change calculation unit 35 calculates the manual control amount Tm according to the steering mode. Based on the input manual control amount Tm, steering angle δh, and actual steering angle 37, the manual steering controller 31 outputs a manual steering control amount 40 for assisting the steering force of the driver.

Figure 3:
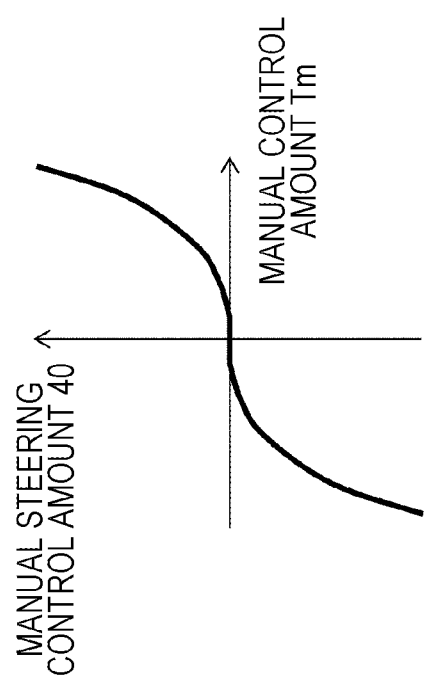
FIG. 3 is a diagram illustrating an example of a relationship between a manual control amount and a manual steering control amount.

FIG. 3 is a diagram illustrating an example of the relationship between the manual control amount Tm and the manual steering control amount 40. The manual steering control amount 40 is a torque command value for requesting the electric motor 7 to produce an output for generating an assist force for assisting the steering force of the driver, which is calculated based on the manual control amount Tm and the correlation as illustrated in FIG. 3. The characteristics illustrated in FIG. 3 may change depending on the vehicle state amount such as the vehicle speed.

Returning to FIG. 2, on the basis of the steering mode information and the steering torque Th included in the input information 21, the control selection unit 33 selects one of the input automatic steering control amount 38 and the input manual steering control amount 40, and outputs the same as a steering control amount Mc.

Based on the steering torque Th and the steering angle δh or the actual steering angle 37, the shift control amount calculation unit 36 calculates a shift control amount Mm for the time of shifting from the automatic steering mode to the manual steering mode, and outputs the calculated shift control amount Mm to the electric motor control amount calculation unit 34.

The electric motor control amount calculation unit 34 outputs an electric motor control amount Mr based on the input steering control amount Mc and shift control amount Mm. The electric motor control amount Mr is a torque command value for requesting the electric motor 7 to produce an output. The electric motor control amount Mr is input to the electric motor drive circuit 44.

The electric motor drive circuit 44 generates a drive current 45 according to the state of the electric motor 7 so as to generate torque corresponding to the input electric motor control amount Mr and drives the electric motor 7 of the steering device 1.

(Description of Operations)

Figure 4:
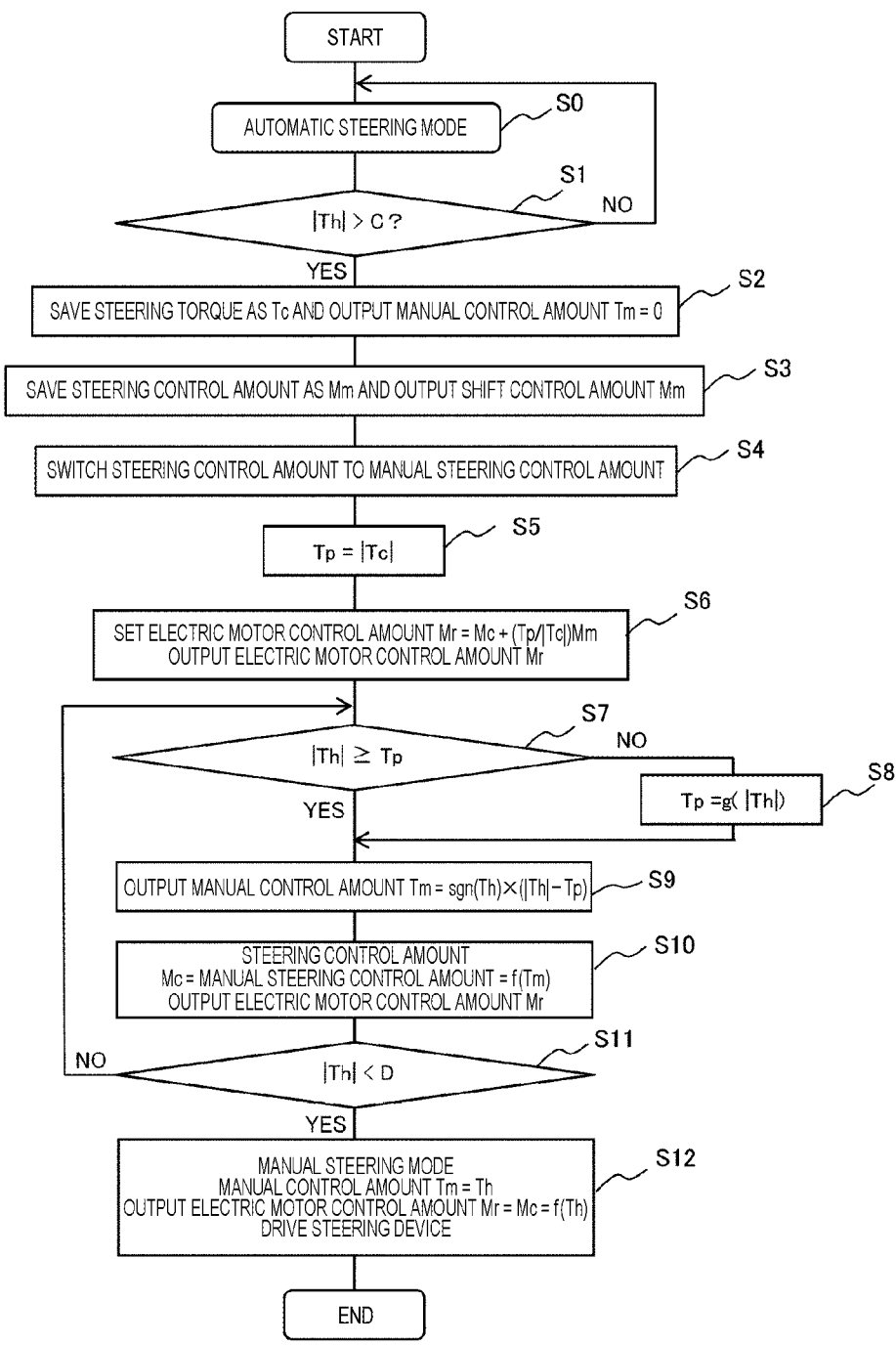
FIG. 4 is a flowchart illustrating an example of steering control.
Figure 5:
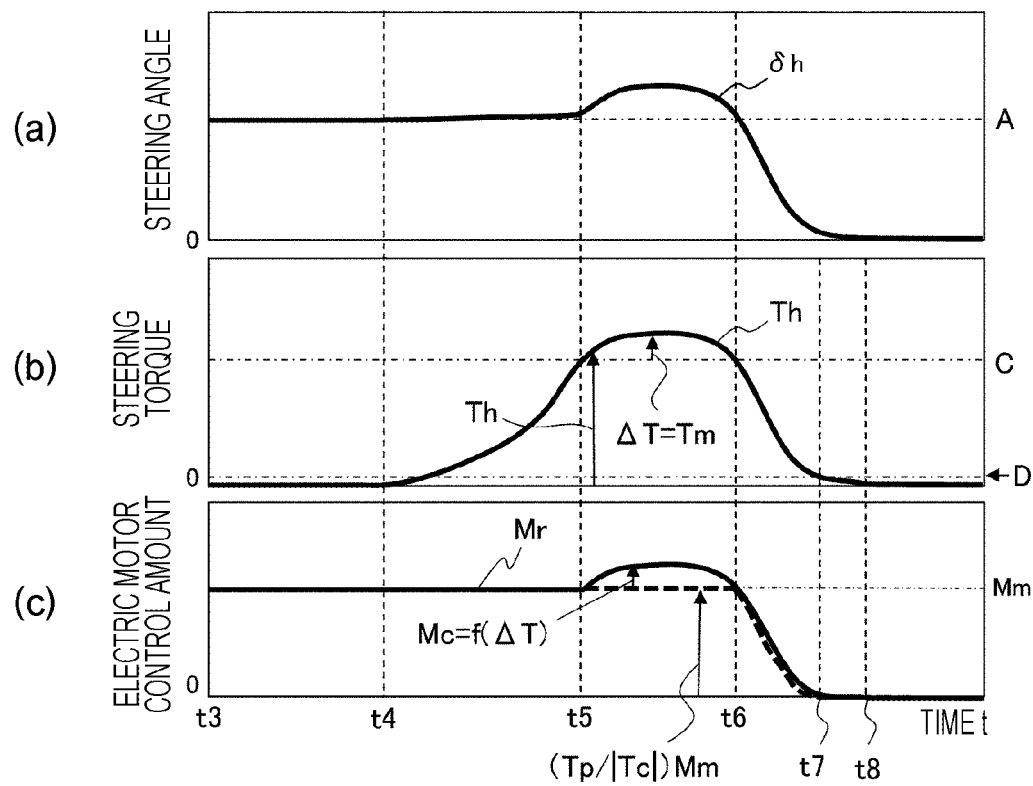
FIG. 5 is a diagram illustrating temporal changes in steering angle, steering torque, and electric motor control amount.

Next, the operations of the steering control device 17 will be described with reference to FIGS. 4 and 5. FIG. 4 is a control flowchart schematically illustrating the control of the steering control device 17 when the driver operates the steering wheel 2 while the vehicle is running in the "automatic steering mode". FIG. 5 is a diagram for describing a state in which the vehicle is running on an arcuate road having a constant curvature. FIG. 5(*a*) illustrates temporal changes in the steering angle δh, FIG. 5(*b*) illustrates temporal changes in the steering torque Th, and FIG. 5(*c*) illustrates temporal changes in the electric motor control amount Mr.

Steps S0 and S1 in FIG. 4 represent processing from t3 to t5 in FIG. 5, steps S2 to S6 represent processing at t=t5, and steps S7 to S12 represent processing at t5 to t7, and step S13 represents processing at t>t7.

<<Step S0>>

In step S0 of FIG. 4, the vehicle is running in the automatic steering mode. That is, the steering mode information included in the input information 21 from the vehicle control device 20 indicates the automatic steering mode, and the input information 21 includes the steering angle target value in the automatic steering mode. The steering control device 17 recognizes the automatic steering mode from the steering mode information, and the automatic steering controller 32 calculates and outputs the automatic steering control amount 38 such that the steering angle target value is realized. The control selection unit 33 outputs the automatic steering control amount input from the automatic steering controller 32 as the steering control amount Mc.

In the automatic steering mode, regardless of the value of the shift control amount Mm input from the shift control amount calculation unit 36, the electric motor control amount calculation unit 34 outputs the steering control amount Mc output from the control selection unit 33 (that is, the automatic steering control amount 38 from the automatic steering controller 32) as the electric motor control amount Mr. Then, the electric motor drive circuit 44 outputs the drive current 45 based on the electric motor control amount Mr to drive the electric motor 7 of the steering device 1 so as to realize the steering angle target value.

At t3 to t4 in FIG. 5, the vehicle is controlled to a constant steering angle (=steering angle target value) in the automatic steering mode so that the vehicle runs on an arcuate road having a constant curvature, and the vehicle is running with the driver's hands released from the steering wheel 2. At this time, since the vehicle is running on a track having a constant curvature, the steering force necessary for turning the wheels 9 is constant. In the automatic steering mode, the steering force depends only on the electric motor 7, and thus the electric motor control amount Mr at t3 to t4 has a constant value as illustrated in FIG. 5(*c*). Since the steering wheel 2 is not operated by the driver at t3 to t4, the steering torque Th is zero (FIG. 5(*b*)), and the steering angle δh is kept constant at an angle A corresponding to the steering angle target value (FIG. 5(*a*)).

<<Step S1>>

In step S1, the steering control device 17 determines whether an absolute value |Th| of the steering torque Th has exceeded a preset steering torque threshold C. When |Th|>C, the steering control device 17 determines that there is a request for shifting to the manual steering mode and the process proceeds to step S2. On the other hand, when |Th|≤C, the process returns to step S0 to continue the automatic steering mode.

In the example illustrated in FIG. 5, the operation of the steering wheel 2 is started by the driver at t=t4. In this case, steering is performed to increase the turning amount of the wheels 9, and the sign of the steering torque Th at that time is made positive.

As described above, in the automatic steering mode, the electric motor control amount Mr is controlled such that the steering angle is maintained at the steering angle target value. Therefore, even if the torsion bar is twisted by the operation of the steering wheel 2 and the steering angle δh changes slightly, the steering angle is kept constant. When the torsion bar is twisted by the operation of the steering wheel 2, the steering torque Th (>0) is detected by the torque sensor 10. From t4 to t5, the steering torque Th increases along with the increase in the twist of the torsion bar. The steering angle δh also slightly increases by the twist of the torsion bar. Then, when |Th|>C at t=t5, the steering control device 17 makes a YES determination in step S1 and the process proceeds to step S2.

<<Step S2>>

When the process proceeds from step S1 to step S2, in step S2, the steering control device 17 stores the steering torque Th at t=t5, that is, the steering torque Th at the time of exceeding when |Th|>C as a variable Tc in a storage unit (not illustrated). At this time, the variable Tc can be regarded as equal to C. Further, the steering control device 17 sets the manual control amount Tm output from the manual change calculation unit 35 to the manual steering controller 31 to Tm=0. As a result, at t=t5, the manual steering control amount 40 output from the manual steering controller 31 becomes zero (see FIG. 3). In this case, the time of exceeding does not need to be strictly t=t5 but the variable Tc may represent the steering torque Th acquired in a time width allowing for a control time lag or the like.

<<Step S3>>

In step S3, the shift control amount calculation unit 36 stores the steering control amount Mc (=the automatic steering control amount 38) output from the control selection unit 33 at the time of exceeding when |Th|>C, and after t=t5, the shift control amount calculation unit 36 outputs the stored Mc as the shift control amount Mm.

<<Step S4>>

In step S4, the control selection unit 33 switches the steering control amount Mc output from the control selection unit 33 from the automatic steering control amount 38 to the manual steering control amount 40.

<<Step S5>>

In step S5, the steering control device 17 stores the absolute value |Tc| of the variable Tc as a variable Tp.

<<Step S6>>

In step S6, the electric motor control amount calculation unit 34 calculates the electric motor control amount Mr by the following equation (1). That is, from t=t5, the electric motor control amount calculation unit 34 calculates the electric motor control amount Mr by the following equation (1) based on the steering control amount Mc and the shift control amount Mm, and outputs the calculated electric motor control amount Mr to an electric motor control amount 43. The electric motor drive circuit 44 generates the drive current 45 based on the electric motor control amount Mr to drive the electric motor 7 of the steering device 1 by the generated drive current 45.

$$Mr=Mc+(Tp/|Tc|)Mm \quad (1)$$

Referring to FIG. 5, when it is determined in step S1 that |Th|>C at t=t5, Tm is set to 0 and the steering control amount Mc(t5) at t=t5 is taken as the shift control amount Mm. When it is determined that Tm=0 in step S2, the manual steering control amount 40 becomes zero. Therefore, when the steering control amount Mc is switched to the manual steering control amount 40 in step S4, the steering control amount Mc output from the control selection unit 33 is Mc=0. Since Tp/|Tc|=1 at t=t5, the electric motor control amount Mr calculated by the equation (1) is Mr=Mm (=Mc(t5)). That is, at t=t5, the electric motor control amount Mr becomes the shift control amount Mm.

<<Step S7>>

In step S7, the steering control device 17 compares the absolute value |Th| of the steering torque Th output from the torque sensor 10 with the variable Tp. When |Th|≥Tp, the process proceeds to step S9, and when |Th|<Tp, the process proceeds to step S8.

In the example illustrated in FIG. 5, since Th>C between t5 and t6, the condition |Th|≥Tp (=C) is satisfied and the process proceeds from step S7 to step S9. Also, from t5 to t6, after the steering wheel 2 is steered in a direction in which the turning amount increases, the steering wheel 2 is operated in a direction in which the turning amount decreases, and the steering angle δh<A and the steering torque Th<C at t≤t6. Therefore, from t5 to t6, the process proceeds from step S7 to step S9, and after t6, it is determined that |Th|<Tp and the process proceeds to step S8.

<<Step S8>>

In step S8, the steering control device 17 replaces the variable Tp set as Tp=|Tc| in step S5 with Tp=g(|Tc|) using a function g(x). In this case, as the function g(x), an arbitrary function in which g(Tc)=Tc and g(0)=0 can be selected.

<<Step S9>>

In step S9, the manual change calculation unit 35 outputs Tm calculated by the following equation (2) as the manual control amount Tm. Note that sgn(Th) represents the sign of Th.

$$Tm=sgn(Th)\times(|Th|-Tp) \quad (2)$$

<<Step S10>>

In step S10, the manual steering controller 31 outputs to the control selection unit 33 the manual steering control amount 40 calculated as f(Tm) in response to the input manual control amount Tm (=sgn(Th)×(|Th|−Tp)). In this case, the function f(x) represents an arbitrary function indicating the relationship between the steering torque and the manual steering control amount. As described above in relation to step S4, the control selection unit 33 outputs the manual steering control amount 40, that is, f(Tm) as the steering control amount Mc, so that the electric motor control amount calculation unit 34 receives an input of f(sgn(Th)×(|Th|−Tp)) as the steering control amount Mc. As a result, the electric motor control amount calculation unit 34 calculates the electric motor control amount Mr from the steering control amount Mc=f(sgn (Th)×(|Th|−Tp)) calculated in step S10, the shift control amount Mm output from the shift control amount calculation unit 36, and the equation (1), and outputs the same.

<<Step S11>>

In step S11, the steering control device 17 compares the absolute value |Th| of the steering torque Th with a preset shift lower limit value D. When |Th|≥D, the process returns to step S7, and when |Th|<D, the process proceeds to step S12.

In the example illustrated in FIG. 5, the processing in "S7, S9, S10, and S11" is repeated at t5<t<t6, and the processing in "S7, S8, S9, S10, and S11" is repeated at t6≤t<t7. Then, at t=t7, the steering control device 17 makes an YES determination in step S11, and the process proceeds to step S12.

At t5<t<t6, Tm calculated in step S9 becomes Tm=|Th|−Tp=ΔT, and the steering control amount Mc in step S10 becomes is Mc=f(ΔT). In this case, ΔT corresponds to the difference between the steering torque Th and the steering torque threshold C illustrated in FIG. 5(b). Also, since Tp/|Tc|=1, the electric motor control amount Mr expressed by the equation (1) becomes Mr=f(ΔT)+Mm. The broken line in FIG. 5(c) indicates (Tp/|Tc|)Mm, which has a constant value Mm when t5<t<t6.

Further, at t6<t<t7, Tp=g(|Th|) calculated in step S8 is used for Tp in the calculation of the manual control amount Tm and the electric motor control amount Mr. Since |Th|<Tp=|Tc|=C in the case of shifting from step S7 to step S8, g(|Th|)<C and g(|Th|) becomes smaller along with the decrease in the steering torque Th. As a result, the manual control amount Tm decreases, and Mc of the first term on the right side of "Mr=Mc+(Tp/|Tc|)Mm" also decreases accordingly. In addition, since Tp/|Tc| also decreases along with the decrease in Tp, the broken line in FIG. 5(c) representing (Tp/|Tc|)Mm also decreases.

By performing this control, the manual control amount Tm calculated in step S9 approaches the actual steering torque as the steering torque Th decreases, and the manual steering control amount (=the steering control amount) in step S10 approaches the value in the normal manual steering mode. Also in the calculation of the electric motor control amount Mr, the value of (Tp/|Tc|)Mm decreases along with the decrease in the steering torque Th, so that the electric motor steering amount Mr gradually approaches the manual steering control amount f(Th). Thereafter, when |Th|<D at t=t7, the process proceeds to step S12.

<<Step S12>>

When it is determined in step S11 that |Th|<D and the process proceeds to step S12, the steering control device 17 determines that the control mode has completely shifted to the manual steering mode. That is, the steering control device 17 sets the shift control amount Mm output from the shift control amount calculation unit 36 to Mm=0, and sets the manual control amount Tm output from the manual change calculation unit 35 to Tm=Th. Therefore, the manual steering control amount f(Th) is output from the manual steering controller 31, and the electric motor control amount Mr output from the electric motor control amount calculation unit 34 becomes equal to the manual steering control amount f(Th), that is, Mr=Mc=f(Th). Thus, after t=t7, the steering device 1 is controlled in the normal manual steering mode.

As described above, when the driver further steers the steering wheel from t=t5 to increase the steering torque Th (step S7), the steering control amount Mc is set to the manual steering control amount f(ΔT) according to a difference ΔT from the steering torque Tc at t=t5 (increase in the case of FIG. 5). Since Th>C at t5 to t6, the process proceeds from step S7 to step S9, but Tp=|Tc| in that case, and thus (Tp/|Tc|)Mm=Mm. Therefore, the electric motor control amount Mr calculated by the equation (1) is Mr=Mc+Mm, and the electric motor control amount Mr increases correspondingly to the increase in the driver's steering from the electric motor control amount (Mm) at t=t5 as a starting point. By performing the control based on ΔT in this manner, as compared with the case where the electric motor control amount Mr is generated based on the steering torque Th at the time of mode switching as in the conventional manner, it is possible to prevent a great change in the output of the electric motor 7 immediately after (at t5) switching from the automatic steering mode to the manual steering mode.

As a result, the driver does not feel that the operation of the steering wheel 2 suddenly becomes lighter or heavier, which produces the effect of facilitating the driving operation when the steering mode shifts. In addition, even in the case of emergency steering, the operation of the driver is reflected immediately after switching the operation mode, thereby making it possible to execute emergency avoidance of an obstacle in a safe manner.

On the other hand, in the vehicle steering device described in PTL 1, when the steering torque in the automatic steering mode exceeds the threshold, the steering mode is simply shifted to the manual steering mode. However, in the manual steering mode, the assist force is generated according to the steering torque Th during the steering wheel operation, and thus the feeling of the steering wheel varies depending on the relationship in magnitude between the actuator output required immediately after the switching (actuator output corresponding to the steering torque Th=C) and the actuator output immediately before the switching.

For example, when the actuator output is larger than the actuator output immediately before the shift and is in the same direction as before the shift, the steering wheel suddenly feels lighter, and in contrast, when the actuator output is smaller than the actuator output immediately before the shift, the steering wheel feels like being pushed back. Such an uncomfortable feeling interferes with the driving operation, which may constitute a factor of disturbing the vehicle behavior when the vehicle is running.

Figure 6:
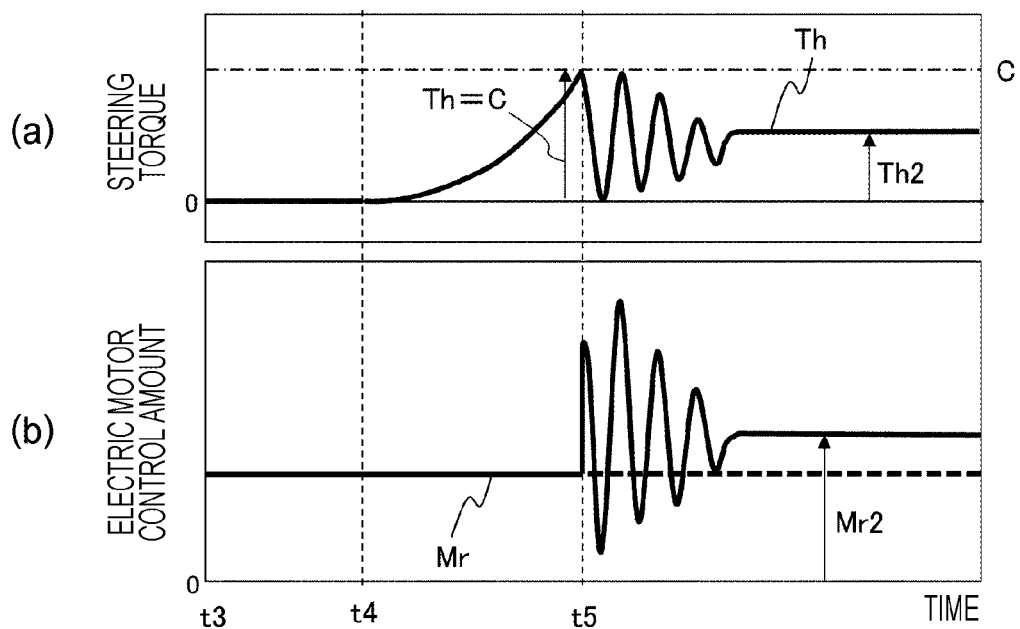
FIG. 6 is a diagram illustrating temporal changes in steering torque and electric motor control amount in a conventional case.

FIG. 6 illustrates the vehicle behavior in the case where the actuator output is larger than immediately before the shift and is in the same direction as immediately before the shift under conventional control. FIG. 6(a) illustrates temporal changes in steering torque, and FIG. 6(b) illustrates temporal changes in electric motor control amount. The driver starts operating the steering wheel 2 at t=t4 to turn the steering wheel at the steering angle corresponding to steering torque Th2. Then, when the steering torque Th exceeds the threshold C for mode switching at t=t5, the operation mode is immediately shifted to the manual operation mode. Therefore, when the assist force abruptly increases according to the steering torque Th=C (>Th2) at the time of shifting, the steering torque also decreases greatly in accordance with the increase in the assist force. In the example of FIG. 6, the electric motor control amount Mr overshoots and becomes larger than an electric motor control amount Mr2 corresponding to the steering torque Th2, and the electric motor control amount Mr and the steering torque Th generate vibrations.

Figure 7:
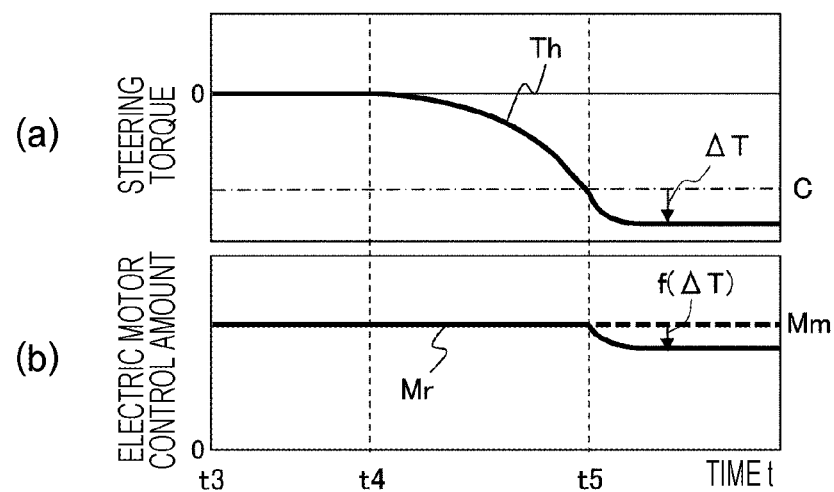
FIG. 7 is a diagram illustrating temporal changes in steering torque and electric motor control amount in the case of turning in the reverse direction.

FIG. 7 illustrates a case where a vehicle running in a track with a constant curvature in the automatic operation mode as in the case of FIG. 5 is turned in the reverse direction, that is, a case where steering is started with the intention of moving to the outside of the track in which the vehicle is running by automatic operation. FIG. 7(a) illustrates temporal changes in the steering torque Th when the driver steers the steering wheel 2, and FIG. 7(b) illustrates temporal changes in the electric motor control amount Mr in that case.

As in the case of FIG. 5 described above, the driver grasps the steering wheel 2 and starts steering at t=t4. At t=t5 when steering torque 11 reaches the steering torque threshold C, the process proceeds to step S2 of FIG. 4. Also, at t=t5, the steering control amount Mc output immediately before (that is, the electric motor control amount Mr=Mc) is held as the shift control amount Mm, and the value obtained by adding the manual steering control amount f(ΔT) corresponding to the steering torque change amount (ΔT) with reference to the steering torque Th at t5 to the shift control amount Mm, as the electric motor control amount Mr. Referring to FIG. 7, since the vehicle is turned in the direction opposite to that in the case illustrated in FIG. 5, the electric motor control amount Mr is output to decrease by f(ΔT) from the electric motor control amount Mr at t=t5 as a starting point.

In the case of the conventional control, if the driver performs steering as illustrated in FIG. 7, an electric motor output is generated to turn the wheels 9 in a direction opposite to the direction in which the wheel 9 was previously turned depending on the amount of steering torque at t=t5, and the driver may turn the vehicle more greatly than expected. However, in the control of the present invention, the operation is changed to reduce the output that has been generated so far, so that the driver does not turn greatly the vehicle by mistake. This makes it possible to obtain an effect of facilitating the driving operation immediately after the shift of the steering mode. In addition, even in the case of emergency steering, the operation of the driver is reflected immediately after switching the operation mode, thereby making it possible to execute emergency avoidance of an obstacle in a safe manner.

Figure 8:
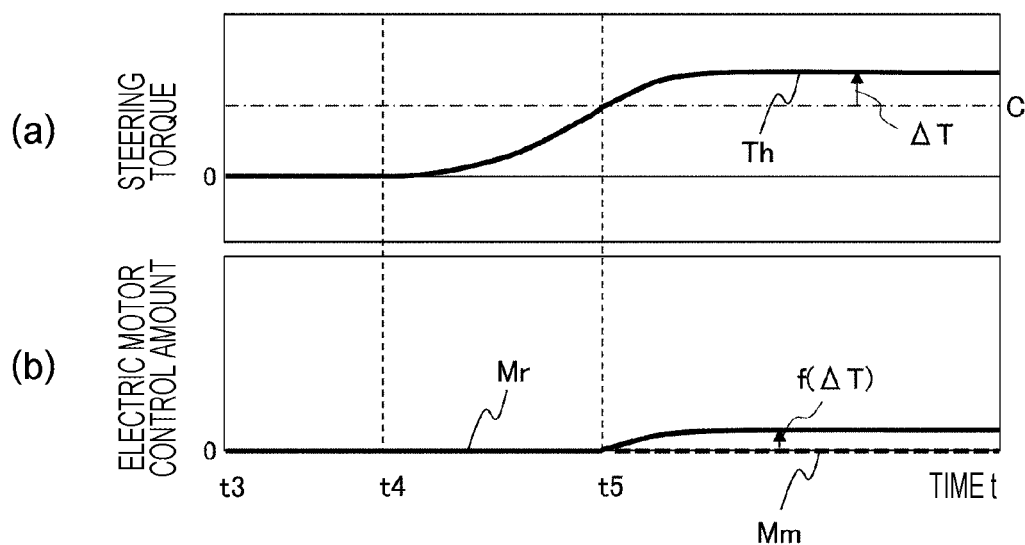
FIG. 8 is a diagram illustrating temporal changes in steering torque and electric motor control amount in the case of changing the lane from the straight running state.

Referring to FIGS. 5 and 7, the case where the steering wheel 2 is operated to shift to the manual steering mode when the vehicle is running at a predetermined curvature in the automatic steering mode has been described above. FIG. 8 illustrates temporal transition in the steering torque Th and the electric motor control amount Mr in a case where the lane is changed from the straight running state. In this case, until the steering torque Th exceeds the threshold C, the electric motor control amount Mr is Mr=0.

Modification Example

Figure 9:
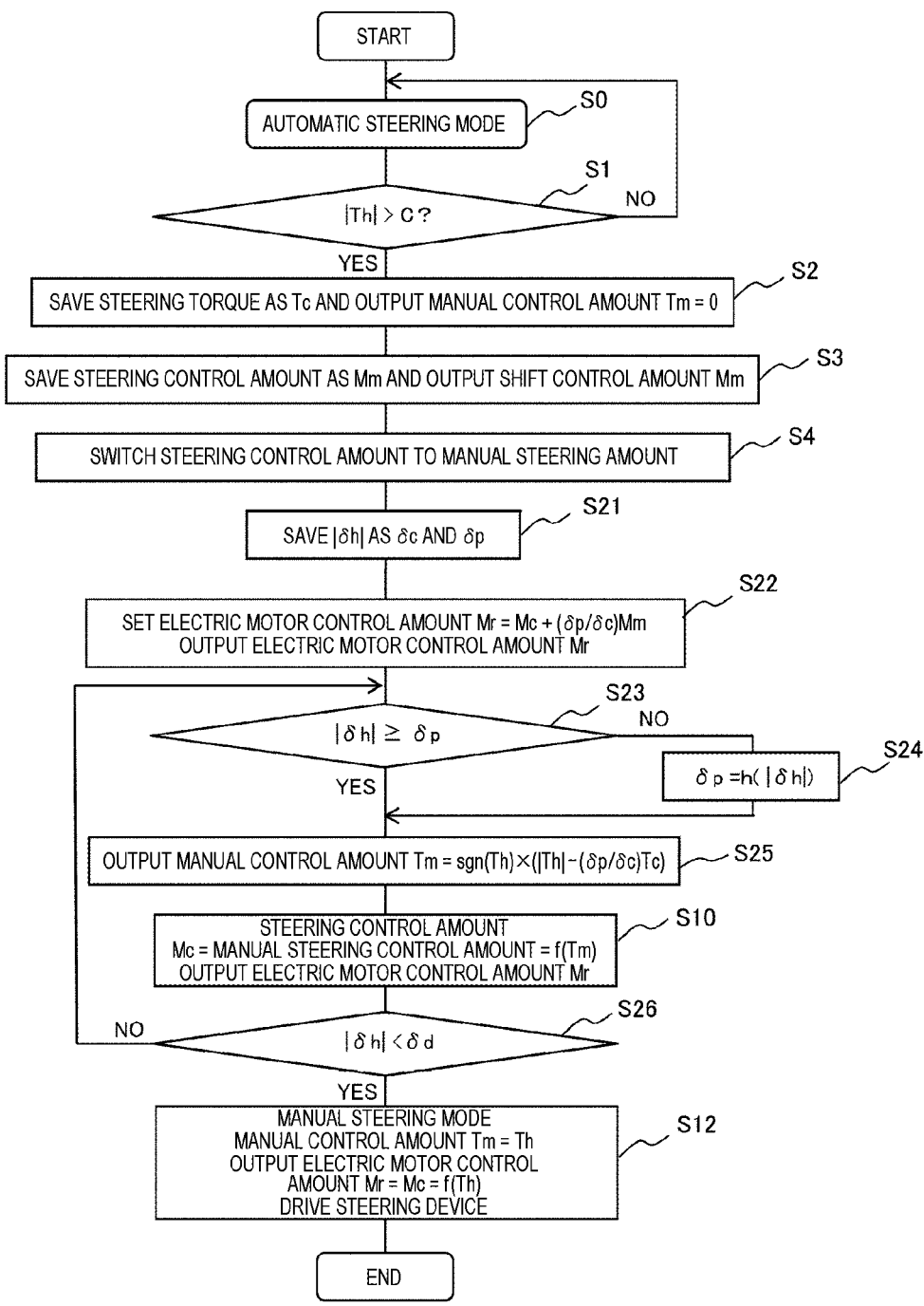
FIG. 9 is a diagram illustrating a flowchart of steering control in a modification example.
Figure 10:
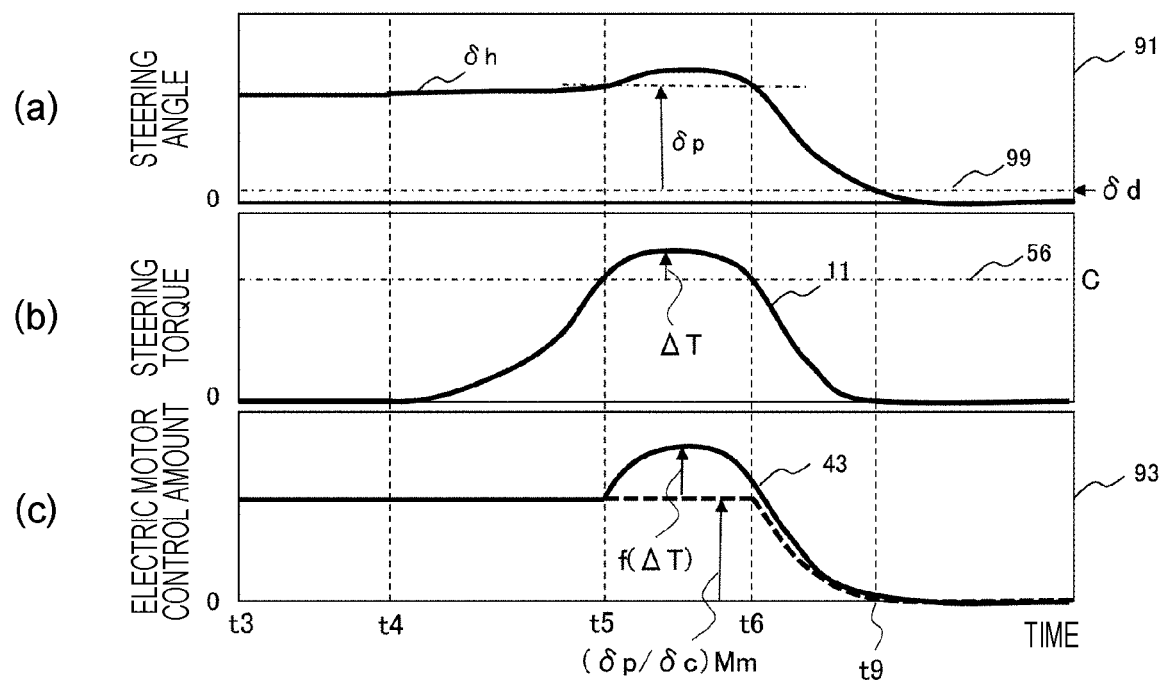
FIG. 10 is a diagram illustrating temporal changes in steering angle, steering torque, and electric motor control amount in the modification example.

FIGS. 9 and 10 are diagrams for describing a modification example. FIG. 9 is a flowchart, and FIG. 10 illustrates temporal changes in the steering angle δh, the steering torque Th, and the electric motor control amount Mr. As in the case of FIG. 5, FIG. 10 illustrates a state in which the vehicle is running on an arc-shaped road with a constant curvature.

In the flowchart of FIG. 4, when the steering torque Th exceeds the threshold C at t=t5 (see FIG. 5), the manual control amount Tm is calculated as "Tm=sgn(Th)×(|Th|−

Tp)" and the electric motor control amount Mr is calculated by the equation (1) according to changes in the steering torque Th at t>t5. On the other hand, in the flowchart of FIG. 9, the manual control amount Tm and the electric motor control amount Mr are calculated according to the steering angle.

In the flowchart of FIG. 9, the same reference signs are given to steps in which the same processing as in the flowchart of FIG. 4 is performed. Hereinafter, steps in which different processing is performed will be mainly described, and redundant explanation will be omitted. Steps S0 to S4 in FIG. 9 are the same as steps S0 to S4 in FIG. 4, and thus descriptions thereof will be omitted. That is, when the steering torque Th exceeds the threshold C, the manual control amount Tm is set to Tm=0, and the steering control amount at the time of exceeding (that is, the automatic steering control amount 38) is output as the shift control amount Mm, and the manual steering control amount 40 is output from the control selection unit 33 as the steering control amount Mc.

<<Step S21>>

In step S21, the steering control device 17 saves an absolute value |δh| of the steering angle δh at the time of exceeding as variables δc and δp.

<<Step S22>>

In step S22, the electric motor control amount calculation unit 34 calculates the electric motor control amount Mr by the following equation (3) based on the steering control amount Mc and the shift control amount Mm, and outputs the electric motor control amount Mr to the electric motor drive circuit 44. At the time of exceeding, since Tm=0, the manual steering control amount 40 and the steering control amount Mc become zero, and since δp=δc=|δh|, the electric motor control amount Mr becomes Mr=Mm.

$$Mr = Mc + (\delta p / \delta c) Mm \quad (3)$$

<<Step S23>>

In step S23, the magnitude of the absolute value |δh| of the steering angle is compared with the magnitude of the variable δp. In the case of |δh|≥δp, the process proceeds to step S25, and in the case of |δh|<δp, the process proceeds to step S24.

<<Step S24>>

When the process proceeds from step S23 to step S24, in step S24, the variable δp is replaced with the value calculated by a function h(|δh|). In this case, an arbitrary function h(x) in which h(δc)=Tc, h(0)=0 can be selected.

<<Step S25>>

In step S25, the manual change calculation unit 35 outputs Tm calculated by the following equation (4) as a manual control amount.

$$Tm = \operatorname{sgn}(Th) \times (|Th| - (\delta p/\delta c) Tc) \quad (4)$$

<<Step S26>>

In step S26, the absolute value |δh| of the steering angle δh is compared with a preset shift lower limit value δd. In the case of |δh|≥δd, the process returns to step S3, and in the case of |δh|<δd, the process proceeds to step S12. That is, when the steering angle δh has returned to almost the neutral position, the process proceeds to step S12, and the steering mode shifts to the complete manual steering mode. In the example illustrated in FIG. 4, the steering mode shifts to the complete manual steering mode when the steering torque |Th|, not the steering angle, becomes smaller than the value D (step S12).

In the example illustrated in FIG. 10, the processing in "S23, S25, S10, and S26" is repeated at t5<t<t6, and the processing in "S23, S24, S25, S10, and S26" is repeated at t6≤t<t9. Then, at t=t9, the steering control device 17 makes an YES determination in step S26, and the process proceeds to step S12.

Since δp/δc=1 at t5<t<t6, Tm calculated in step S25 is Tm=|Th|−Tc=ΔT, and the steering control amount Mc in step S10 is Mc=f(ΔT). Also, the electric motor control amount Mr expressed by the equation (3) is Mr=f(ΔT)+Mm. The broken line in FIG. 10(c) indicates (δp/δc)Mm, which has constant value Mm at t5<t<t6.

Further, at t6<t<t9, δp=h (|δh|) calculated in step S24 is used for δp in the calculation of the manual control amount Tm and the electric motor control amount Mr. In the case of shifting from step S23 to step S24, since |δh|<δp=δc, δp=h (|δh|) calculated in step S24 becomes δp<δc. The value of δp (=h(|δh|)) becomes smaller as the steering angle δh decreases. As a result, when δh decreases at t6<t<t9 as illustrated in FIG. 10(a), the manual control amount Tm also decreases, and Mc in the first term on the right side of "Mr=Mc+(δp/δc)Mm" decrease as well accordingly. In addition, since (δp/δc) decreases along with decrease in δp, the dashed line in FIG. 10(c) representing (δp/δc)Mm also tends to decrease.

By performing this control, the manual control amount Tm calculated in step S25 approaches the actual steering torque along with the reduction in the steering angle δh, and the manual steering control amount (=the steering control amount) in step S10 approaches the value in the normal manual steering mode. Also in the electric motor control amount Mr, the value of (δp/δc)Mm decreases along with the decrease in the steering angle δh, so that the electric motor steering amount Mr approaches the value of the manual steering control amount. Thereafter, when |δh|<δd at t=t9, the process proceeds to step S12.

Also in the case of the modification example described above, Mr=Mm is set at the time of exceeding when |Th|>C, and thereafter, the change amount ΔT=|Th|−Tc of the steering torque with reference to the threshold C is set to the manual control amount Tm. At this time, since the electric motor control amount Mr is Mr=Mc+Mm where Mc=f(ΔT), the electric motor control amount Mr changes from the electric motor control amount (Mm) at t=t5 as a starting point in correspondence with the change in the steering torque Th. Therefore, as compared with the conventional case where the electric motor control amount Mr is generated based on the steering torque Th at the time of mode switching, it is possible to prevent a great change in the output of the electric motor 7 immediately after switching from the automatic steering mode to the manual steering mode.

In the explanation of FIGS. 5, 7, 8, and 10, the change in the electric motor control amount Mr has been described as an example, but the drive current 45 output to the electric motor 7 also changes in almost the same manner according to the steering torque Th.

In the processing in step S3 of FIG. 4 described above, the steering control amount Mc when the steering torque Th exceeds the threshold C is stored as Mm and is output as the shift control amount. Alternatively, the value obtained by subtracting the steering torque Th at that time (for example, the threshold C) from the steering control amount Mc at the time of exceeding may be output as the shift control amount Mm. Since the vehicle is in the automatic steering mode at t<t5, even when the driver steers the steering wheel in this automatic steering mode, the vehicle tends to stay on the track of automatic operation against the driver's steering, and the output of the electric motor 7 changes (becomes slightly smaller) by the driver's steering torque. Therefore, by subtracting the steering torque Th at that time from the steering control amount Mc at the time of exceeding, the electric motor control amount Mr at the time of shift from the automatic steering mode to the manual steering mode at t=5 does not deviate, so that the connection is continued.

In addition, control is performed such that the steering control amount Mc at the time of exceeding is stored as Mm and the constant value Mm is output as the shift control amount. However, the shift control amount may be set with the steering control amount Mc (=Mm) at the time of exceeding as the upper limit. After t5, the terms including Mm of the equations (1) and (3) are set without exceeding this upper limit Mm.

Figure 11:
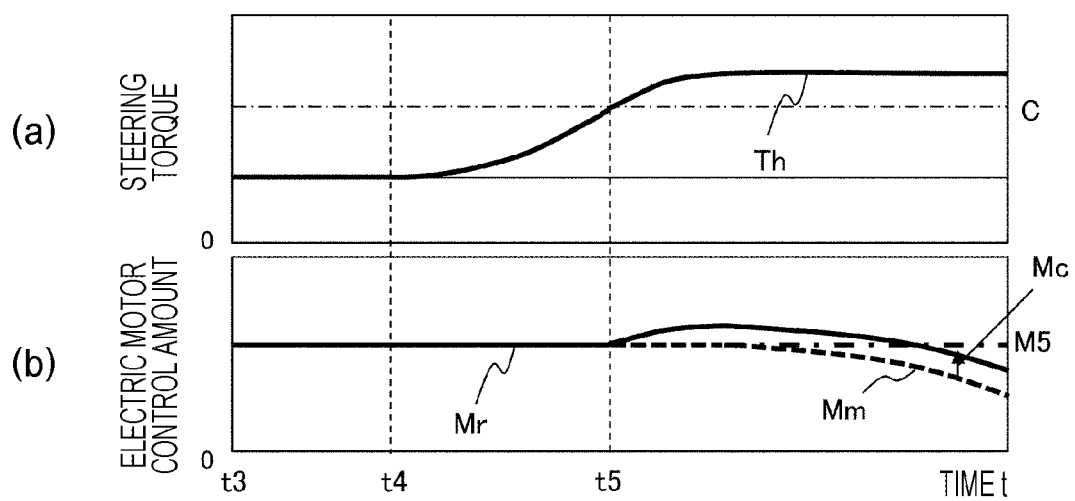
FIG. 11 is a diagram illustrating an example of a case where a shift control amount is set so as not to exceed a steering control amount at the time of exceeding as the upper limit.
Figure 12:
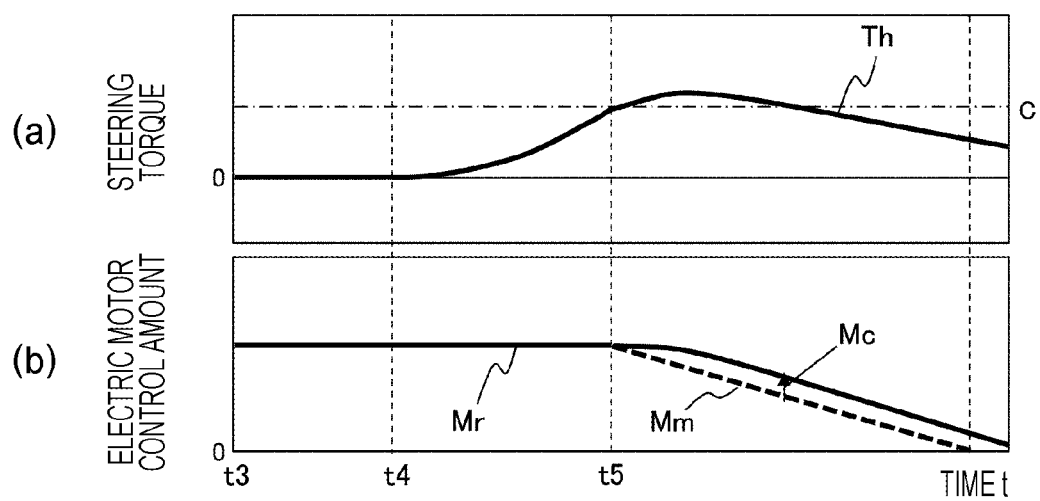
FIG. 12 is a diagram illustrating another example of a case where a shift control amount is set so as not to exceed a steering control amount at the time of exceeding as the upper limit.

For example, when the curvature of the track of the automatic operation decreases after t5, the shift control amount Mm is lowered even after t5 when the steering torque 11 exceeded the threshold C as illustrated in FIG. 11, based on the result of calculation by the automatic steering controller 32 with the steering control amount M5 at t5 as the upper limit, that is, in consideration of the automatic steering control amount 38 planned for use after t5 in the automatic steering mode. Further, the shift control amount Mm may be gradually decreased with the lapse of time as illustrated in FIG. 12. Even in this case, the effect of reducing the feel of discomfort experienced by the driver at the time (t5) of shift from the automatic steering mode to the manual steering mode can be obtained.

It has been described that, in the shift control amount calculation unit 36 illustrated in FIG. 1, the steering control amount Mc when the steering torque Th exceeds the threshold C is used as the shift control amount Mm. Alternatively, the electric motor control amount inversely calculated with the steering control amount at the time of exceeding as the upper limit from the output of the steering device 1 necessary for maintaining the turning amount of the wheels 9 at this point from the vehicle state amount may be used as the shift control amount Mm. For example, the force applied to the wheels is estimated from the yaw rate of the current vehicle motion, and the electric motor control amount that can counter the force is given.

In addition, in the flows illustrated in FIGS. 4 and 8, when the steering torque Th as an index of the manual operation amount of the steering wheel 2 exceeds the threshold C, the processing from step S2 onward is executed. Alternatively, instead of the steering torque Th, the steering angle δh may be used as an index of the manual operation amount so that the processing from step S2 onward is executed when the difference between the steering angle δh as the driver's steering angle request value and the actual steering angle 37 becomes greater than a predetermined steering angle difference threshold.

In step S10, the manual steering control amount 40 is calculated according to the manual control amount Tm as the manual steering change. Alternatively, the value obtained by applying a low pass filter to this calculated value may be set as the manual steering control amount. This makes it possible to reduce the feeling of discomfort when shifting from the automatic steering mode to the manual steering mode.

Second Embodiment

Figure 13:
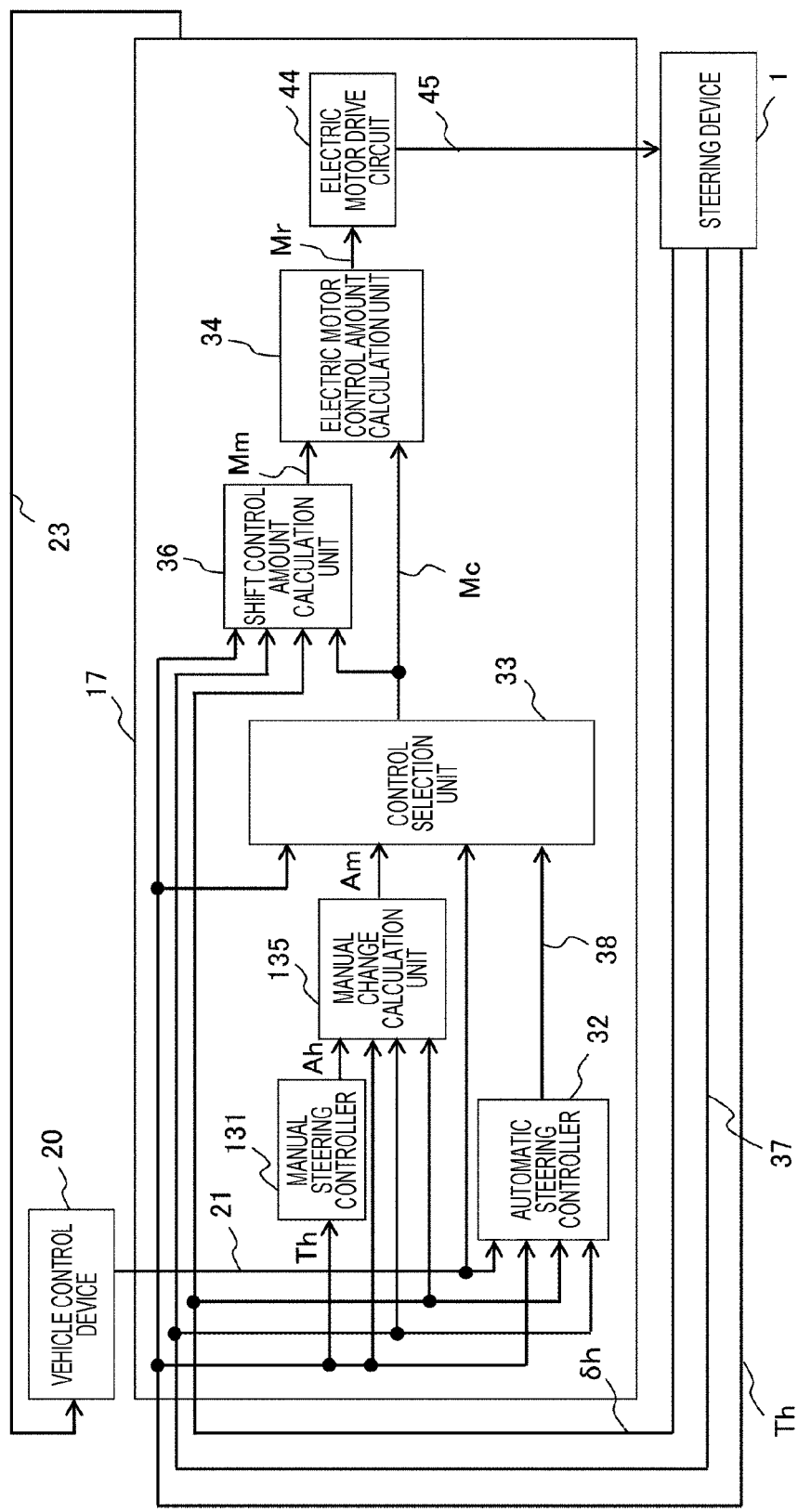
FIG. 13 is a block diagram illustrating a configuration of a steering control device according to a second embodiment.
Figure 14:
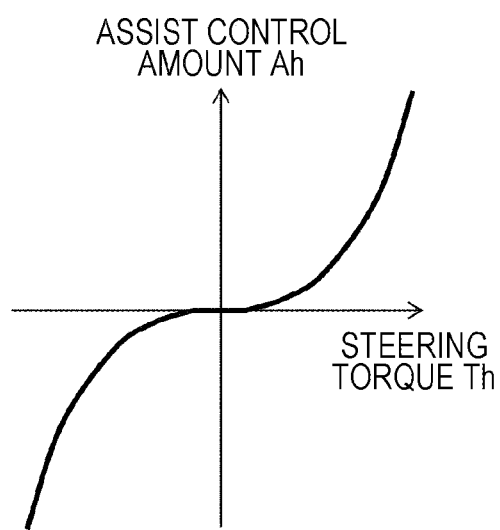
FIG. 14 is a diagram illustrating an example of a correlation between steering torque and an assist control amount.

Next, a second embodiment of the present invention will be described with reference to FIGS. 13 to 15. FIG. 13 is a block diagram illustrating a configuration of the steering control device 17. The second embodiment is different from the first embodiment in the method of extracting the manual change due to steering by the driver in the steering control device 17, but in the other respects, the second embodiment is configured in the same manner as the first embodiment. Since the components of the steering device 1 are the same as those of the first embodiment, and thus descriptions thereof will be omitted. As for the steering control device 17, the same components as those illustrated in FIG. 2 will be given the same reference signs as those illustrated in FIG. 2 and descriptions thereof will be omitted.

Referring to FIG. 13, a manual steering controller 131 and a manual change calculation unit 135 are different in configuration from those illustrated in FIG. 2. The manual steering controller 131 calculates an assist control amount Ah based on input steering torque Th. The manual steering controller 131 outputs the assist control amount Ah to the input steering torque Th based on the relationship of correlation between the steering torque Th and the assist control amount Ah as illustrated in FIG. 14. The assist control amount Ah is a torque command value for requesting the electric motor 7 to produce an output to generate an assist force for the driver's steering force. The manual change calculation unit 135 accepts inputs of the assist control amount Ah, the steering torque Th, a steering angle δh, and an actual steering angle 37, and the manual change calculation unit 135 calculates a manual steering control amount Am according to the steering mode based on the input values.

Figure 15:
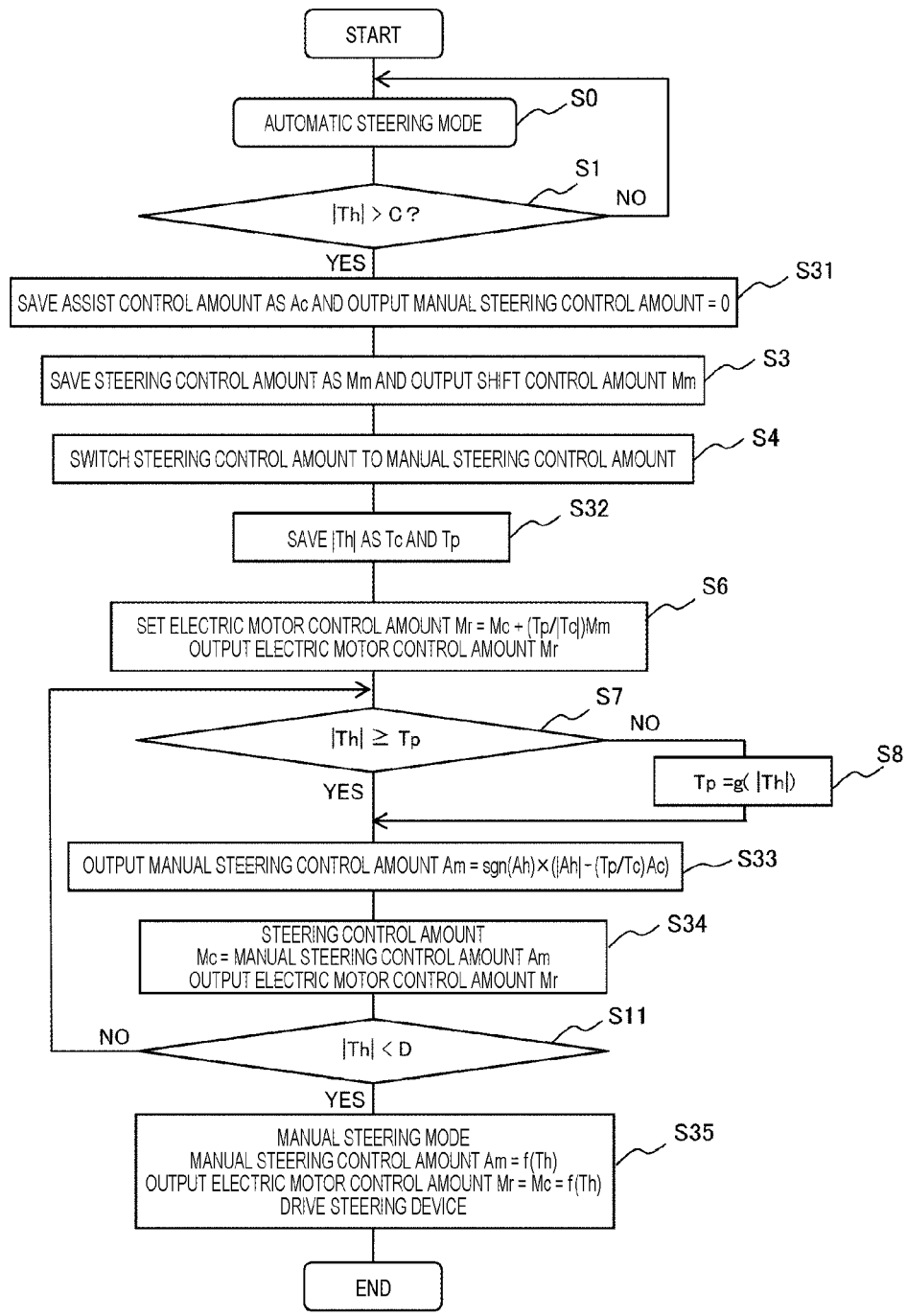
FIG. 15 is a flowchart illustrating an example of steering control according to the second embodiment.

FIG. 15 is a control flowchart describing an outline of control by the steering control device 17. Also in FIG. 15, the steps in which the same processing is performed as that in the control flow illustrated in FIG. 4 are given the same reference signs as those in FIG. 4, and descriptions of these steps will be omitted.

<<Step S31>>

When it is determined in step S1 that |Th|>C, the process proceeds to step S31. In step S31, the steering control device 17 saves the assist control amount Ah output from the manual steering controller 131 as Ac and sets the manual steering control amount Am output from the manual change calculation unit 135 to zero.

<<Step S32>>

In step S32, the steering control device 17 saves the absolute value |Th| of the steering torque Th when |Th|>C (t=t5 in FIG. 16 described later) as variables Tp and Tc.

<<Step S33>>

When it is determined in step S7 that |Th|≥Tp and the process proceeds to step S33, the manual change calculation unit 135 outputs Am calculated by the following equation (5) as a manual steering control amount in step S33. In the equation (5), Ah represents the assist control amount obtained from the characteristics described in FIG. 14 with respect to the steering torque Th obtained at the present time.

$$Am = \text{sgn}(Ah) \times (|Ah| - (Tp/Tc)Ac) \quad (5)$$

<<Step S34>>

In step S34, the control selection unit 33 outputs the manual steering control amount Am input from the manual change calculation unit 135 as the steering control amount Mc. As a result, the electric motor control amount calculation unit 34 calculates the electric motor control amount Mr from the steering control amount Mc output from the control selection unit 33, the shift control amount Mm output from the shift control amount calculation unit 36, and the equation (1) described above, and outputs the same.

<<Step S35>>

When it is determined in step S11 that |Th|<D and the process proceeds to step S35, the steering control device 17 determines that the control mode has completely shifted to the manual steering mode. In step S35, the steering control device sets the shift control amount Mm output from the shift control amount calculation unit 36 as Mm=0. Further, the manual change calculation unit 135 outputs f(Th) calculated based on a function f(x) representing the relationship between the steering torque and the manual steering control amount and the input steering torque Th as the manual steering control amount Am. As a result, the electric motor control amount Mr calculated by the equation (1) in the electric motor control amount calculation unit 34 is the same as the manual steering control amount f(Th) as Mr=Mc=f (Th). Accordingly, the steering device 1 is controlled in the normal manual steering mode.

Figure 16:
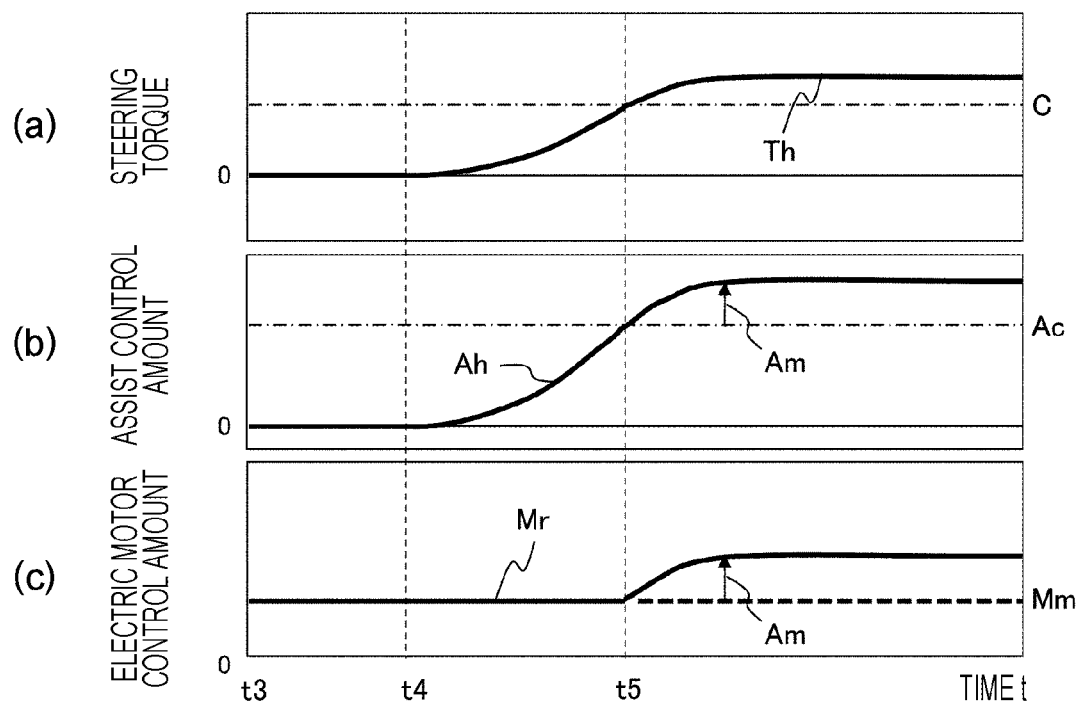
FIG. 16 is a diagram illustrating temporal changes in steering torque, assist control amount, and electric motor control amount in the second embodiment.

FIG. 16 is a diagram illustrating an example of vehicle operation. FIG. 16(a) illustrates temporal changes in the steering torque Th, FIG. 16(b) illustrates temporal changes in the assist control amount Ah, and FIG. 16(c) illustrates temporal changes in the electric motor control amount Mr. As in the case of FIG. 5, the vehicle is running on an arcuate road having a constant curvature, and in the automatic steering mode (t<t5), the electric motor control amount calculation unit 34 outputs a constant electric motor control amount Mr. Further, FIG. 16 illustrates the case where the processing proceeds from S7 to S8, S33, S34, and S11 in the case illustrated in FIG. 15.

In the section from t=t3 to t=t4, the vehicle is running in the automatic operation mode with the driver's hands released from the steering wheel 2 (step S0). When the vehicle is running on a track with a constant curvature, the steering force of the steering device 1 necessary for turning the wheels 9 is constant, so that the electric motor control amount Mr has a constant value as illustrated in FIG. 16(c).

Then, at t=t4, the driver grips the steering wheel 2 and starts steering. In the example illustrated in FIG. 16, the steering is performed to move to the inside of the arc, that is, to increase the turning amount of the wheels 9. As illustrated in FIG. 16(a), the steering torque Th starts to rise from t=t4.

When determining that the steering torque Th exceeds the threshold C at t=t5 and the driver is requesting the shift from the automatic steering mode to the manual steering mode (step S1), the steering control device 17 saves the assist control amount Ah at that time as Ac, and sets the manual steering control amount Am to zero (step S31). At the same time, the steering control device 17 saves the steering control amount Mc at this time as Mm, and causes the shift control amount calculation unit 36 to output the Mm as the shift control amount (step S3).

Thereafter, the steering control device 17 switches the steering control amount Mc as the output of the control selection unit 33 to the manual steering control amount Am (step S4). At the same time, when the steering torque Th exceeds the threshold C, the steering control device 17 saves the absolute value |Th| of the steering torque Th as Tc and Tp (step S32). At this point of time, since the manual steering control amount Am is output as 0, Mc=0. In addition, since Tc=Tp=|Th|, the electric motor control amount Mr calculated by the expression (1) is Mr=Mm (step S6).

When the driver further performs steering from t=t5 to increase the steering torque Th (step S7), the manual steering control amount Am calculated by the equation (5) is Am=Ah−Ac. At this time, since the control selection unit 33 selects the manual steering control amount Am, the steering control amount Mc output from the control selection unit 33 is Mc=Am (step S34). As a result, the electric motor control amount Mr calculated by the equation (1) is Mr=Am+Mm (see FIG. 16(c)).

By performing the control as illustrated in FIG. 15, the electric motor control amount Mr increases in correspondence with the increase in the driver's steering from the electric motor control amount Mr at the point of time when the threshold C is exceeded (=Mm) as a starting point, as illustrated at t>t5 in FIG. 16. This makes it possible to prevent a significant change in the electric motor output at the time of switching from the automatic steering mode to the manual steering mode. As a result, it is possible to reduce the feeling of discomfort that the operation of the steering wheel 2 suddenly becomes lighter or heavier, and facilitate the driving operation when the steering mode is switched. In addition, even in the case of emergency steering, the operation of the driver is reflected immediately after switching the operation mode, so emergency avoidance of an obstacle can safely be executed.

Third Embodiment

Figure 17:
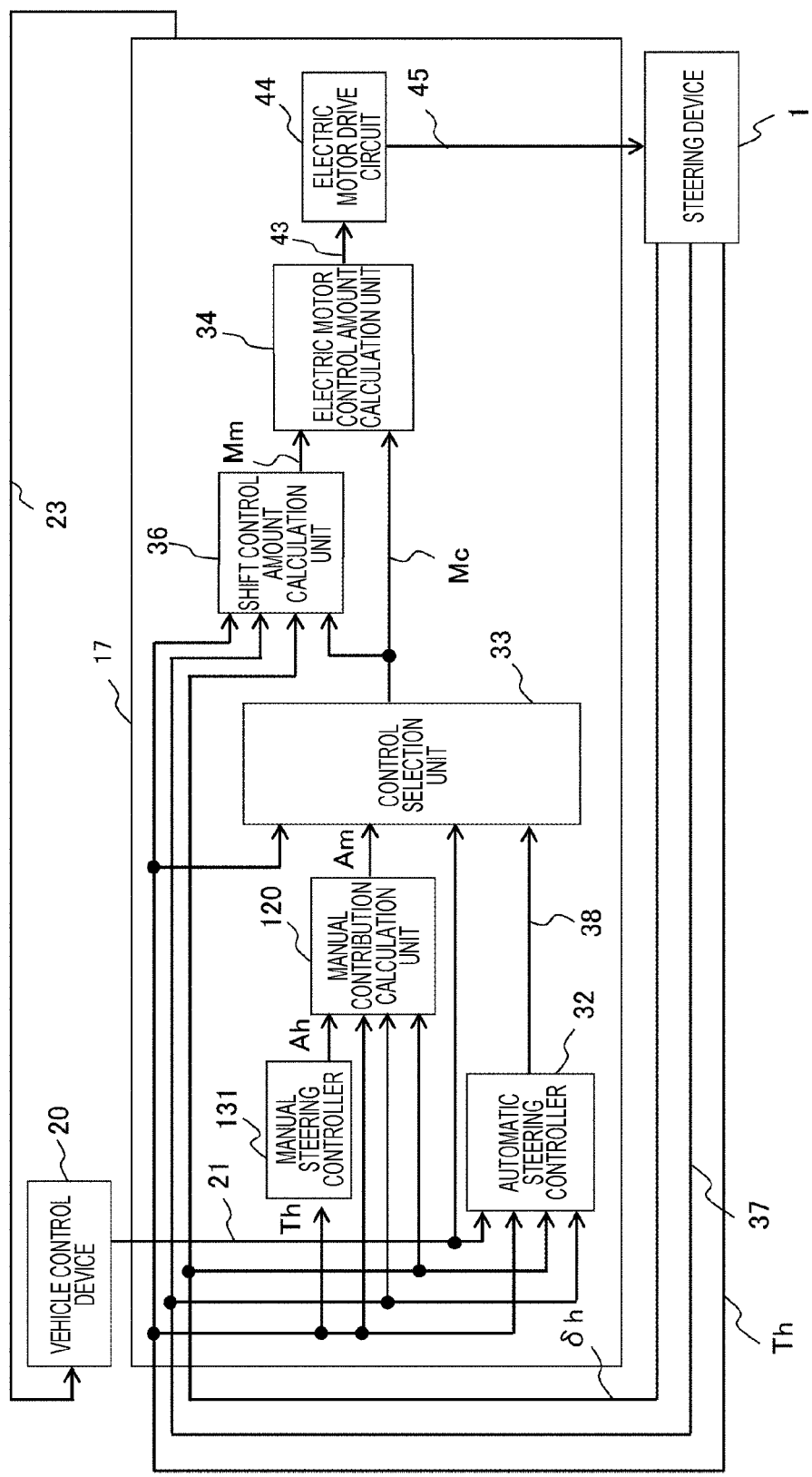
FIG. 17 is a block diagram illustrating a configuration of a steering control device according to a third embodiment.

Next, a third embodiment of the present invention will be described with reference to FIGS. 17 to 19. FIG. 17 is a diagram illustrating a configuration of a steering control device 17, which is different from the second embodiment in that a manual contribution calculation unit 120 is provided in place of the manual change calculation unit 135 illustrated in FIG. 13. The manual contribution calculation unit 120 calculates a manual steering control amount Am according to the steering mode based on the assist control amount Ah, the steering torque Th, the steering angle δh, and the actual steering angle 37. Since the components of the steering device 1 are the same as those of the first embodiment, and thus descriptions thereof will be omitted. As for the steering control device 17, the same components as those illustrated in FIG. 13 will be given the same numbers as those illustrated in FIG. 13 and descriptions thereof will be omitted.

Figure 18:
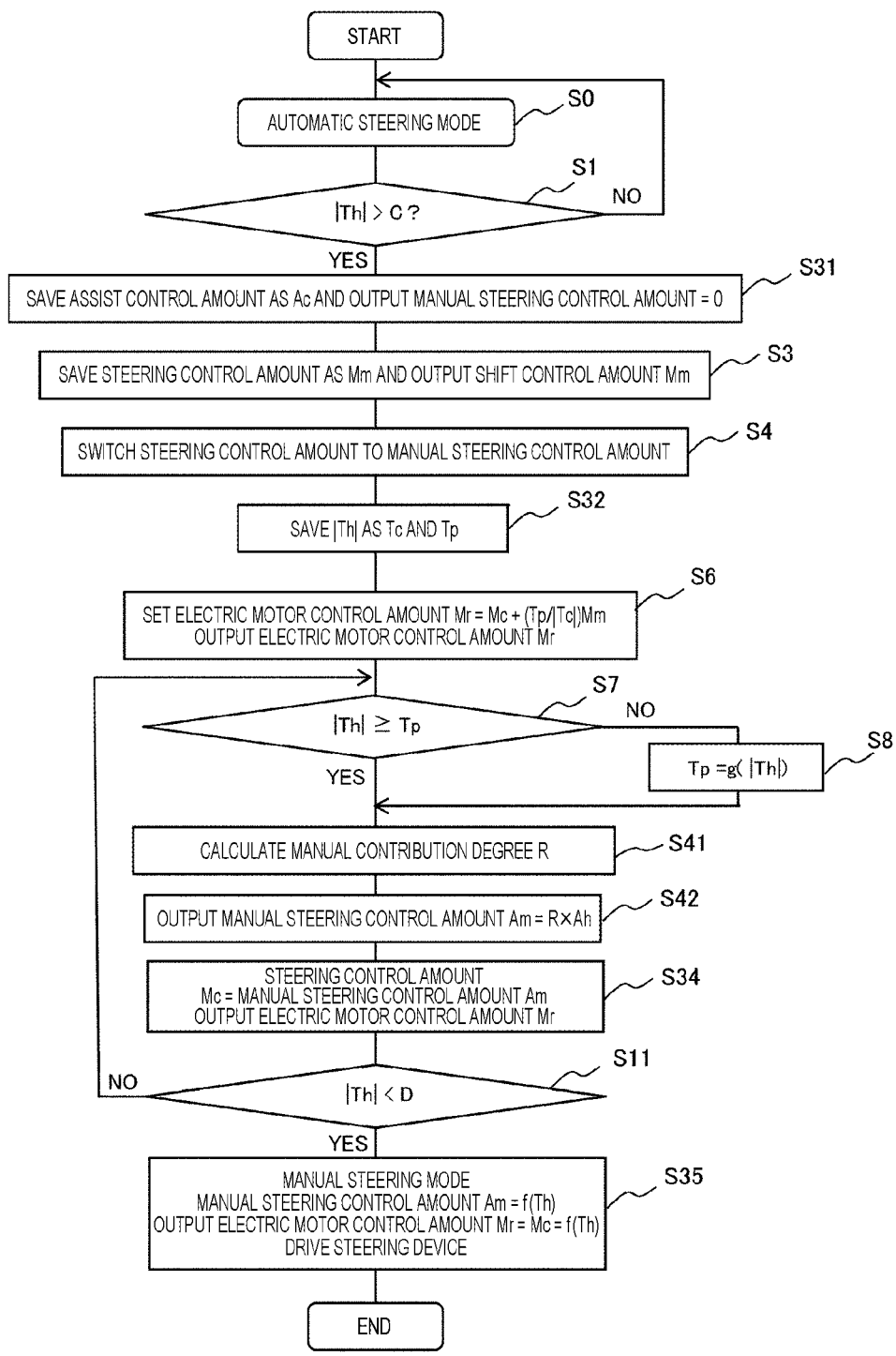
FIG. 18 is a flowchart illustrating an example of steering control in the third embodiment.

FIG. 18 is a control flowchart describing an outline of control by the steering control device 17. In FIG. 18, the processing in step S41 and step S42 is different from that in the flowchart of FIG. 15. Also in FIG. 18, the steps in which the same processing is performed as that in the control flow illustrated in FIG. 15 are given the same reference signs as those in FIG. 15, and descriptions of these steps will be omitted.

<<Step S41>>

When it is determined in step S7 that |Th| Tp and the process proceeds to step S41, the manual contribution calculation unit 120 calculates a manual contribution degree R in step S41. The manual contribution degree R is an index representing the degree of a manual operation, which is calculated as 0 when the steering torque Th exceeds the threshold C, then gradually increases with the lapse of time, and then becomes 1 at maximum.

<<Step S42>>

In step S42, the manual contribution calculation unit 120 calculates the manual steering control amount Am such that Am=R×Ah, based on the calculated manual contribution degree R and the assist control amount Ah input from the manual steering controller 131, and outputs the same.

Then, as in the second embodiment, the calculated manual braking control amount Am is substituted into the steering control amount Mc in the equation (1) to calculate the electric motor control amount Mr.

Figure 19:
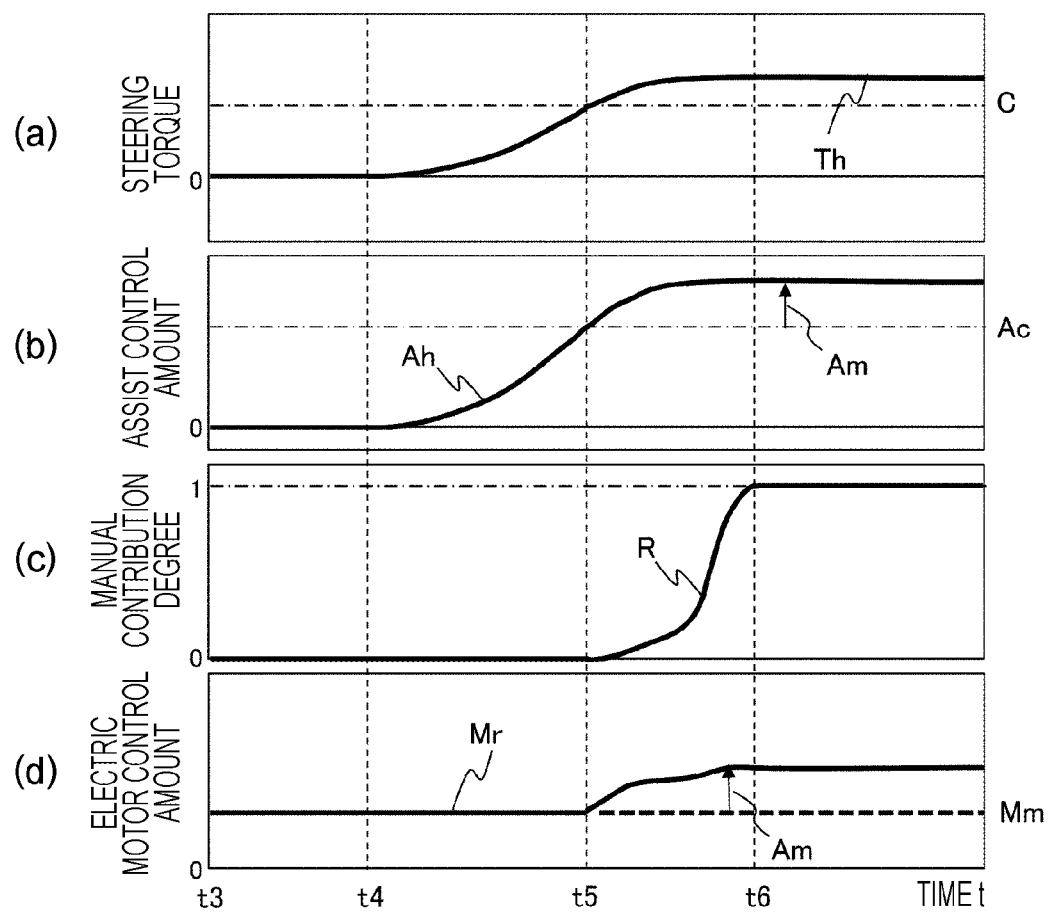
FIG. 19 is a diagram illustrating temporal changes in steering torque, assist control amount, manual contribution degree, and electric motor control amount in the third embodiment.

FIG. 19 is a diagram illustrating an example of a vehicle operation. FIG. 19(a) illustrates temporal changes in the steering torque Th, FIG. 16(b) illustrates temporal changes in the assist control amount Ah, FIG. 16(c) illustrates temporal changes in the manual contribution degree R calculated by the manual contribution calculation unit 120, and FIG. 16(d) illustrates temporal changes in the electric motor control amount Mr. As in the case of FIG. 16, FIG. 19 illustrates a state in which the vehicle is running on an arc-shaped road with a constant curvature. Further, FIG. 19 illustrates the case where the processing proceeds from S7 to S8, S41, S42, S34, and S11 in the case illustrated in FIG. 18.

When the steering torque Th is generated, the assist control amount Ah is calculated according to the steering torque Th. Accordingly, as the steering torque Th rises from t=t5, the assist control amount Ah also rises. The manual contribution degree R is intended to set the degree of contribution as the ratio of the manual operation to the electric motor control amount after the steering torque Th exceeds the threshold C. Since the manual steering control amount Am immediately after the shift from the automatic steering mode to the manual steering mode (t=t5) is zero (step S31), the manual contribution degree R is 0. After t5 when the steering torque Th exceeds the threshold C, the manual contribution degree R is set such that the manual steering control amount Am=R×Ah has a value corresponding to the exceeding amount to the exceeding amount (=Th−C) of the steering torque Th.

Referring to FIG. 18, in the section from t=t3 to t4, the vehicle is running in the automatic operation mode with the driver's hands released from the steering wheel 2, and at the time t=t4, the driver grips the steering wheel 2 and starts steering, and the steering torque Th exceeds the threshold C at t=t5. The manual contribution calculation unit 120 sets the manual contribution degree R to 0 at t=t5, and after t5, gradually increases the manual contribution degree R from 0 to 1 (t=t6) with the lapse of time.

Performing the control as illustrated in FIG. 18 makes it possible to prevent a significant change in the electric motor output at the time of switching from the automatic steering mode to the manual steering mode. As a result, it is possible to reduce the feeling of discomfort that the operation of the steering wheel 2 suddenly becomes lighter or heavier, and facilitate the driving operation when the steering mode is switched. In addition, even in the case of emergency steering, the operation of the driver is reflected immediately after switching the operation mode, so emergency avoidance of an obstacle can safely be executed.

Although not illustrated in FIG. 18, in the case where a NO determination is made in step S7 and the process proceeds from S7 to S8, S41, S42, and S34, when the steering torque Th becomes smaller than the threshold C, the term of (Tp/|Th|)Mm in the electric motor control amount Mr decreases as in the case of the first embodiment. Then, when it is determined that |Th|<D, the mode is shifted to the normal manual steering mode. In the case of the present embodiment, as in the case of the first and second embodiments described above, it is possible to reduce the feel of discomfort of manual steering at the time of switching from the automatic steering mode to the manual steering mode.

According to the embodiments determined above, the following operations and advantageous effects can be obtained.

(C1) For example, as illustrated in FIGS. 1, 2, and 4, the steering control device 17 includes: the automatic steering controller 32 that generates the automatic steering control amount 38 of the electric motor 7 for steering vehicle wheels based on an automatic running instruction input from the vehicle control device 20; and the manual steering controller 31 that generates the manual steering control amount 40 of the electric motor 7 based on the steering torque Th as an index of the manual operation amount of the steering wheel 2 as the manual operation unit for steering the vehicle wheels. The steering control device 17 selects one of the automatic steering mode in which the electric motor 7 is controlled by the automatic steering control amount 38 and the manual steering mode in which the electric motor 7 is controlled by the manual steering control amount 40 to control the electric motor 7.

When |Th| of the steering torque Th of the steering wheel 2 exceeds the threshold C during the control in the automatic steering mode, the manual steering controller 31 generates the steering control amount Mc=f (ΔT) as the manual steering control amount change based on the change ΔT of the steering torque Th with respect to the time of exceeding, generates the manual steering control amount f(Th), controls the electric motor 7 based on the electric motor control amount Mr obtained by adding the steering control amount Mc=f (ΔT) to the shift control amount Mm as the automatic steering control amount at the time of exceeding, and then controls the electric motor 7 in the manual steering mode. As illustrated in FIG. 5(c), Mr=f(ΔT)+Mm at t5 to t6.

Therefore, as illustrated in FIG. 10(c), the electric motor control amount Mr changes from Mm at the time of exceeding (t5) corresponding to the change ΔT of the steering torque Th with respect to the time of exceeding according to the steering control amount Mc=f(ΔT). As a result, it is possible to prevent a great change in the output of the electric motor 7 immediately after switching from the automatic steering mode to the manual steering mode, so that the driver does not feel discomfort in the operation of the steering wheel 2.

That is, at the time of shift from the automatic steering mode to the manual steering mode in response to the driver's operation in the automatic steering mode, the output difference of the actuator in the steering device can be suppressed. This makes it possible to reduce the feel of discomfort when the driver shifts to the manual steering mode, so that the driving operation after the shift to the manual steering mode becomes easy to continue safe driving. Further, the driving operation of the driver is immediately reflected after the shift to the manual steering mode, which facilitates operations such as emergency avoidance.

(C2) The manual steering control amount change after the exceeding may be the manual steering control amount Tm=f(ΔT) generated by the manual steering controller 31 based on the change amount ΔT of the steering torque Th with reference to the time of exceeding as illustrated above with reference to FIGS. 4 and 8 or may be the change in the assist control amount (=|Ah|−Ac) described above with reference to FIG. 14.

(C3) As illustrated in FIG. 18, as the manual steering control amount change Mc after the exceeding, the manual steering control amount Am obtained by multiplying the assist control amount Ah output from the manual steering controller 131 by the manual contribution degree R gradually increasing from zero in accordance with the lapse of time from the time of exceeding may be used.

(C4) Instead of Mr=f(ΔT)+Mm illustrated in FIG. 5(c), Mr=Mc+Mm as illustrated in FIGS. 11(b) and 12(b) may be used as the electric motor control amount. For example, referring to FIG. 11 (b), the electric motor control amount Mr is obtained by adding the manual steering control amount change Mc to the shift control amount Mm calculated with the automatic steering control amount M5 at the time of exceeding as the upper limit.

(C5) In the example illustrated in FIG. 11(b), the automatic steering control amount after t5 may be used as the shift control amount Mm. By performing this control, the shift from the automatic steering mode to the manual steering mode is performed with reference to the running route planned by the automatic steering control amount.

(C6) A control may be performed such that, when, after it is determined that |Th|>C, |Th| decreases and it is determined that |Th|<C, the electric motor control amount Mr is decreased in accordance with the decrease in the steering torque Th, and that, when the magnitude of the steering torque Th falls below the shift lower limit value D, the mode is shifted to the complete manual steering mode in which the manual steering control amount f(Tm) is applied as the electric motor control amount Mr. By performing this control, it is possible not only to reduce the feeling of discomfort of the steering immediately after shifting from the automatic steering mode to the manual steering mode, but also to achieve smooth steering without the feeling of discomfort until completely shifting from the automatic steering mode to the manual steering mode.

As illustrated in FIG. 9, when the magnitude of the steering angle δh falls below the value δp as the first steering angle threshold, in the case of decreasing the manual control amount Tm following the decrease in the steering angle δh to decrease the electric motor control amount Mr, a control is performed to shift to the complete manual steering mode when the magnitude of the steering angle δh falls below the shift lower limit value δd.

The various embodiments and modification examples have been described so far, but the present invention is not limited to them. The present invention also includes other modes that are conceivable within the scope of the technical idea of the present invention.

The entire disclosure of the following application on the basis of which the priority is claimed is hereby incorporated by reference herein.

Japanese Patent Application No. 2016-226787 (filed on Nov. 22, 2016)

REFERENCE SIGNS LIST 1 steering device
2 steering wheel
7 electric motor
10 torque sensor
17 steering control device
31 manual steering controller
32 automatic steering controller
33 control selection unit
34 electric motor control amount calculation unit
35 manual change calculation unit
36 shift control amount calculation unit
38 automatic steering control amount
40, Am manual steering control amount
Mc steering control amount Mc
Mm shift control amount
Mr electric motor steering amount
Th steering torque
Tm manual control amount
δh steering angle

The invention claimed is:

1. A steering control device comprising:
an automatic steering controller configured to generate an automatic steering control amount of a steering actuator for turning a vehicle wheel based on an input automatic running command; and
a manual steering controller configured to generate a manual steering control amount of the steering actuator based on a manual operation amount of a manual operation unit for turning the vehicle wheel, wherein
the steering control device selects one of an automatic steering mode for controlling the steering actuator by the automatic steering control amount and a manual steering mode for controlling the steering actuator by the manual steering control amount to control the steering actuator,
when the manual operation amount of the manual operation unit for turning the vehicle wheel exceeds a predetermined value during the control in the automatic steering mode at a first point in time, the steering control device controls the steering actuator based on an electric motor control amount obtained by adding a manual steering control amount change, which is calculated based on a change amount in the manual operation amount from the first point in time, to a shift control amount, which is set based on the automatic steering control amount at the first point in time, until a control mode is shifted to the manual steering mode, wherein
when magnitude of the manual operation amount exceeds the predetermined value at the first point in time and then falls below the predetermined value, the first control amount is decreased in accordance with the decrease of the manual operation amount, and
when the magnitude of the manual operation amount falls below the predetermined value and then falls below a manual steering mode shift operation amount smaller than the predetermined value, the steering actuator is controlled in the manual steering mode.

2. The steering control device according to claim 1, wherein the manual operation amount is a steering torque detected in accordance with an operation amount of the manual operation unit, and
the manual steering control amount change is a manual steering control amount generated by the manual steering controller based on a change amount of the steering torque with reference to the first point in time.

3. The steering control device according to claim 1, wherein the manual operation amount is a steering torque detected in accordance with an operation amount of the manual operation unit, and
the manual steering control amount change is a change amount of the manual steering control amount with reference to the first point in time.

4. The steering control device according to claim 1, wherein the manual operation amount is a steering torque detected in accordance with an operation amount of the manual operation unit, and
the manual steering control amount change is a product of the manual steering control amount and a manual contribution degree increasing from zero from the first point in time.

5. The steering control device according to claim 1, wherein the steering actuator is controlled based on a second control amount obtained by adding the manual steering control amount change to a shift control amount calculated with the automatic steering control amount at the first point in time as an upper limit.

6. The steering control device according to claim 1, wherein the steering actuator is controlled based on a third control amount obtained by adding the manual steering control amount change to the automatic steering control amount.

7. The steering control device according to claim 1, wherein when magnitude of the manual operation amount exceeds the predetermined value at the first point in time and then a steering angle falls below a first steering angle threshold along with operation of the manual operation unit, the first control amount is decreased in accordance with the decrease of the steering angle, and when the steering angle falls below a second steering angle threshold smaller than the first steering angle threshold, the steering actuator is controlled in the manual steering mode.

\* \* \* \* \*